US008082232B2

(12) United States Patent
Okada et al.

(10) Patent No.: US 8,082,232 B2
(45) Date of Patent: Dec. 20, 2011

(54) RECOVERY METHOD USING CDP

(75) Inventors: Wataru Okada, Yokohama (JP);
Masayuki Yamamoto, Sagamihara (JP);
Masahide Sato, Noda (JP)

(73) Assignee: Hitachi, Ltd., Tokyo (JP)

( * ) Notice: Subject to any disclaimer, the term of this patent is extended or adjusted under 35 U.S.C. 154(b) by 278 days.

(21) Appl. No.: 12/270,389

(22) Filed: Nov. 13, 2008

(65) Prior Publication Data
US 2009/0070390 A1 Mar. 12, 2009

Related U.S. Application Data

(63) Continuation of application No. 11/598,187, filed on Nov. 8, 2006, now Pat. No. 7,467,165.

(30) Foreign Application Priority Data

Sep. 20, 2006 (JP) ................................. 2006-253787

(51) Int. Cl.
G06F 7/00 (2006.01)
G06F 17/00 (2006.01)
(52) U.S. Cl. ...................................................... 707/682
(58) Field of Classification Search ........... 707/999.204, 707/682
See application file for complete search history.

(56) References Cited

U.S. PATENT DOCUMENTS

| 7,409,414 B2 | 8/2008 | Okada et al. |
| 2004/0193945 A1 | 9/2004 | Eguchi et al. |
| 2005/0015416 A1 | 1/2005 | Yamagami |
| 2005/0086443 A1 | 4/2005 | Mizuno et al. |
| 2007/0112893 A1* | 5/2007 | Okada et al. ................ 707/204 |
| 2007/0112894 A1 | 5/2007 | Okada et al. |
| 2007/0198604 A1 | 8/2007 | Okada et al. |

FOREIGN PATENT DOCUMENTS

| JP | 2004-252686 A | 9/2004 |
| JP | 2005122611 A | 5/2005 |

OTHER PUBLICATIONS

Japanese Office Action dated Sep. 4, 2008.

* cited by examiner

Primary Examiner — Usmaan Saeed
Assistant Examiner — Navneet K Ahluwalia
(74) Attorney, Agent, or Firm — Sughrue Mion, PLLC

(57) ABSTRACT

First information representing a plurality of snapshot acquisition time points of the data storage device, journal management data which are second information including the time point at which data are written to the data storage device and the size of the journal for writing the data, and third information representing a plurality of recovery points are acquired. The total transfer data size of one or more data to be transferred in order to recover the data group of the data storage device at the recovery point is calculated for each recovery point on the basis of the first information, journal management data, and third information. A display screen that visualizes the correspondence relationship between the respective recovery points and respective recovery load information representing a recovery load that is expressed on the basis of the total transfer data size calculated for the respective recovery points is displayed.

16 Claims, 18 Drawing Sheets

FIG. 2

JOURNAL GROUP TABLE

| JNLG_ID | SEQUENCE COUNTER |
|---|---|
| JNLG_1 | 110 |
| JNLG_2 | 103 |
| JNLG_3 | 104 |
| ... | ... |

FIG. 3

DATA VOLUME TABLE

| JNLG_ID | DATA VOLUME ID | SIZE |
|---|---|---|
| JNLG_1 | LU_11 | 10G |
| JNLG_1 | LU_12 | 10G |
| JNLG_1 | LU_13 | 10G |
| JNLG_2 | LU_14 | 20G |
| ... | ... | ... |

FIG. 4

SNAPSHOT VOLUME MANAGEMENT TABLE

| SSVOL GROUP ID | SNAPSHOT VOLUME ID | CORRESPONDING DATA VOLUME ID |
|---|---|---|
| SSG_1 | LU_21 | LU_11 |
| SSG_1 | LU_22 | LU_12 |
| SSG_1 | LU_23 | LU_13 |
| SSG_2 | LU_24 | LU_11 |
| ... | ... | |

FIG. 5

SSVOL GROUP MANAGEMENT TABLE

| JNLG_ID | SSVOL GROUP ID | SEQUENTIAL NUMBER | ACQUISITION TIME |
|---|---|---|---|
| JNLG_1 | SSG_1 | 100 | 2005/06/01 10:00 |
| JNLG_1 | SSG_2 | 105 | 2005/06/01 11:00 |
| JNLG_1 | SSG_3 | 110 | 2005/06/01 12:00 |
| JNLG_2 | SSG_4 | 100 | 2005/06/01 10:00 |
| ... | ... | | |

FIG. 6

JOURNAL VOLUME TABLE

| JNLG_ID | JNL VOLUME ID | USAGE SEQUENCE |
|---------|---------------|----------------|
| JNLG_1  | LU_31         | 1              |
| JNLG_1  | LU_32         | 2              |
| JNLG_2  | LU_34         | 1              |
| ...     | ...           |                |

JOURNAL MANAGEMENT DATA

| | |
|---|---|
| DATA VOLUME ID | 7001 |
| APPLICATION DESTINATION ADDRESS | 7002 |
| DATA LENGTH | 7003 |
| GENERATION TIME | 7004 |
| SEQUENTIAL NUMBER | 7005 |
| AFTER JOURNAL STORAGE VOLUME ID | 7006 |
| AFTER JOURNAL STORAGE ADDRESS | 7007 |
| BEFORE JOURNAL STORAGE VOLUME ID | 7008 |
| BEFORE JOURNAL STORAGE ADDRESS | 7009 |
| COMMENT | 7010 |

DATA VOLUME TABLE

| JNLG_ID | DATA VOLUME ID | SIZE | WRITE CAPABILITY |
|---|---|---|---|
| JNLG_1 | LU_11 | 10G | 200Mbps |
| JNLG_1 | LU_12 | 10G | 200Mbps |
| JNLG_1 | LU_13 | 10G | 200Mbps |
| JNLG_2 | LU_14 | 20G | 200Mbps |
| ... | ... | ... | ... |

FIG. 12

SNAPSHOT VOLUME MANAGEMENT TABLE

| SSVOL GROUP ID | SNAPSHOT VOLUME ID | CORRESPONDING DATA VOLUME ID | WRITE CAPABILITY |
|---|---|---|---|
| SSG_1 | LU_21 | LU_11 | 200Mbps |
| SSG_1 | LU_22 | LU_12 | 200Mbps |
| SSG_1 | LU_23 | LU_13 | 200Mbps |
| SSG_2 | LU_24 | LU_11 | 200Mbps |
| ... | ... | ... | ... |

FIG. 13

JOURNAL VOLUME TABLE

| JNLG_ID | JNL VOLUME ID | USAGE SEQUENCE | WRITE CAPABILITY |
|---------|---------------|----------------|------------------|
| JNLG_1  | LU_31         | 1              | 400Mbps          |
| JNLG_1  | LU_32         | 2              | 400Mbps          |
| JNLG_2  | LU_34         | 1              | 400Mbps          |
| ...     | ...           | ...            | ...              |

FIG. 16

SSVOL GROUP MANAGEMENT TABLE

| JNLG_ID 5001 | SSVOL GROUP ID 5002 | SEQUENTIAL NUMBER 5003 | ACQUISITION TIME 5004 | SNAPSHOT TYPE 16005 | COPY AMOUNT AT RECOVERY 16006 |
|---|---|---|---|---|---|
| JNLG_1 | SSG_1 | 100 | 2005/06/01 10:00 | FULL BACKUP | 100G |
| JNLG_1 | SSG_2 | 105 | 2005/06/01 11:00 | DIFFERENTIAL MANAGEMENT FULL BACKUP | 10G |
| JNLG_1 | SSG_3 | 110 | 2005/06/01 12:00 | DIFFERENTIAL MANAGEMENT FULL BACKUP | 5G |
| JNLG_2 | SSG_4 | 100 | 2005/06/01 10:00 | SNAPSHOT | 5G |
| ... | ... | | | | |

```
JNLG ID=JNLG_1
MAXIMUM DATA LOSS AMOUNT (TIME) DUE TO DATA NON-UPDATE = 30 min
MAXIMUM DATA LOSS AMOUNT (TIME) DUE TO DATA UPDATE = 30 min
# MAXIMUM DATA LOSS AMOUNT (DATA AMOUNT) DUE TO DATA NON-UPDATE = 30Gb
# MAXIMUM DATA LOSS AMOUNT (DATA AMOUNT) DUE TO DATA UPDATE = 30Gb
MAXIMUM JOURNAL APPLICATION AMOUNT = 30 Gb

JNLG_ID= " JNLG_2"
   ...
```

FIG. 21

| SELECTION 21011 | TIME 21012 | COMMENT 21013 | JNL APPLICATION AMOUNT 21014 | DATA LOSS AMOUNT 21015 | FIRST CANDIDATE 21016 |
|---|---|---|---|---|---|
| | 2006/07/19 10:30 | QUIESCENT POINT | 0Mb | 20Gb | |
| | 2006/07/19 10:55 | END OF BATCH PROCESSING APPLICATION | 20Gb | 0Mb | O |
| | 2006/07/19 11:00 | QUIESCENT POINT | 0Mb | 3Gb | |

21019

21010

RUN 21021   CANCEL 21022

RECOVERY METHOD USING CDP

CROSS-REFERENCE TO PRIOR APPLICATION

This is a continuation of application Ser. No. 11/598,187 filed Nov. 8, 2006 now U.S. Pat. No. 7,467,165. The entire disclosure(s) of the prior application(s), application Ser. No. 11/598,187 is considered part of the disclosure of the accompanying continuation application and is hereby incorporated by reference.

This application relates to and claims the benefit of priority from Japanese Patent Application No. 2006-253787, filed on Sep. 20, 2006, the entire disclosure of which is incorporated herein by reference.

BACKGROUND

The present invention generally relates to a technology for recovering data.

Generally, information systems are capable of recovering lost data when data is lost as a result of a storage system fault, data corruption caused by a computer virus, an erroneous operation by the user, or the like, by acquiring backups at regular intervals.

One emerging backup and recovery technology is a backup and recovery technology that uses journaling (See published U.S. Patent Application No. 2005/0015416, for example). Published U.S. Patent Application No. 2005/0015416 discloses a technology that acquires a snapshot (logical image of a full backup or partial backup or the like taken at a specified time point of a logical group constituted by one or more data volumes (called a 'journal group' hereinbelow), stores subsequent write data to the data volumes in journal volumes associated with the journal group as journals (called an 'after journal'), and applies a series of after journals according to the order in which same were written to the acquired snapshot, whereby data at a specified time point are recovered. This is an example of a technology generally known as 'Continuous Data Protection' or, in its abbreviated form, 'CDP'.

Furthermore, Published U.S. Patent Application No. 2005/0015416 also proposes a method that cancels the after journal application when data that has been recovered by the after journal application is found to have been corrupted. Published U.S. Patent Application No. 2005/0015416 discloses the fact that localized data that is overwritten by the after journal application is saved to the journal volume and, when the after journal application is cancelled, the data is recovered to the snapshot prior to the after journal application in a short time by applying the saved data to the original point (writing the save data) to the snapshot to which the after journal is applied. The saved data is known as the 'before journal'.

In Japanese Patent Application Laid Open No. 2004-252686, a technology that simultaneously acquires an after journal and before journal during writing from the host computer is also disclosed. According to this technology, previous data can be recovered by applying the before journal to the operating data volume. Further, the after journal, before journal and the journal management metadata are collected and simply called 'journals'. Further, the snapshot which is the journal application target during recovery is called the 'base snapshot'.

Generally, in the recovery of a computer system, it is necessary to reduce the time required for completing the recovery process (recovery time) as much as possible.

In addition, in the recovery of a computer system, sometimes time point data of either of two or more times may be recovered. For example, when a file that has been deleted by an erroneous user operation is restored, any time point data may be restored from the file creation time point up until immediately before the file was deleted. Further, in the case that the point of the time the data must be recovered existed at is uncertain (for example, the period the data must be recovered existed is not known), we must recover the data which existed at the point of time specified from rough estimate, and validate the recovered data. So too in this case, this does not necessarily mean that data at a strictly determined time point is recovered but, rather, that data of any time point in a certain time range (close to 10:00, for example) is recovered. Further, any time point data between batch processes may also be recovered when data updated only by the contents batch processing among all the data of the database (DB) is recovered. That is, any time point data between the events of applications and tasks may be recovered. In addition, even when a system that has been halted as a result of a data fault or the like is restarted, any time point data up to and including the data fault may be restored. However, this is limited to cases where the latest data is not needed for the restart. For example, in the case of the mail server, because the latest mail data is not required for the restart, this applies to this example (there may be a need to restore the latest mail data).

It should be noted that in the case of the technology disclosed in Published U.S. Patent Application No. 2005/0015416 and Japanese Patent Application Laid Open No. 2004-252686, the time interval (recovery time) required to recover data of the specified time point (recovery point) depends on the number and size of the journals applied to the base snapshot during recovery. That is, the recovery times of the data at each time point are different from one another. However, in Published U.S. Patent Application No. 2005/0015416 and Japanese Patent Application Laid Open No. 2004-252686, when the user chooses which time point data to recover, the information relating to the recovery time is not displayed. Hence, when the time point data of any of two or more time points may be recovered, there is the problem that data that requires a longer recovery time than necessary is sometimes recovered.

SUMMARY

One aspect of the present invention is to allow the user to correctly select a recover point whereby the recovery time is kept short.

Further aspects of the present invention will become clear from the following description.

The control device according to the present invention is a control device of a storage system that allows recovery using CDP to be executed.

The storage system comprises a first storage region, a second storage region, a third storage region, and a recovery execution section. The first storage region stores first information representing a plurality of snapshot acquisition time points of a data storage device in which data transmitted from a higher level device (a host computer or other storage device, for example) are stored. The second storage region stores, for respective journals, journal management data which are second information including a time point at which data are written to the data storage device and a size of the journal for writing the data. The third storage region stores third information representing a plurality of recovery points which are a plurality of recoverable time points of the data storage device. The recovery execution section recovers a data group in the data storage device at a recovery point designated by a recovery execution request among the plurality of recovery points. More specifically, the recovery execution section is constituted to recover the data group in the data storage device at the designated recovery point among the plurality of recovery points by applying, to the data group of the data storage device at a snapshot acquisition time point that corresponds with the designated recovery point among the plurality of snapshot acquisition time points, a journal that corresponds with journal management data the writing time point of which is between the corresponding snapshot acquisition time point and the designated recovery point.

Here, the 'snapshot acquisition time point corresponding to the designated recovery point' is, for example, the snapshot acquisition time point corresponding to the base data group in a case where there is only one data group which is a base for recovering a data group at the recovery point ('base data group' hereinbelow), for example. This case can correspond to a case where the journal applied during recovery is either an after journal or a before journal, for example. Meanwhile, in another case which is a case where there are a plurality of base data groups for recovering data groups at the designated recovery point, the snapshot acquisition time point corresponding to the designated recovery point is a snapshot acquisition time point corresponding to a base data group for which the recovery load is minimal among the plurality of base data groups. Another case corresponds to a case where, for example, the storage system has a constitution that permits restoration by selecting either an after journal or before journal.

Furthermore, the data storage device may be provided in the storage system and, when another storage system is connected to the storage system such that a remote copy is performed between the storage systems, the data storage device may also be provided in the other storage system.

The control device of the aforesaid storage system comprises an acquisition section, a calculation section, a display section, a recovery point selection receipt section, and a recovery request section. The acquisition section acquires first information representing the plurality of snapshot acquisition time points, the respective journal management data, and third information representing the plurality of recovery points. The calculation section calculates, for each recovery point, the total transfer data size of one or more data to be transferred in order to recover the data group of the data storage device at the recovery point, on the basis of a plurality of snapshot acquisition time points represented by the acquired first information, the respective writing time points and respective journal sizes of the respective journal management data, and a plurality of recovery points represented by the acquired third information. The display section displays a display screen that visualizes a correspondence relationship between the respective recovery points and respective recovery load information representing a recovery load that is expressed on the basis of the total transfer data size calculated for the respective recovery points; a recovery point selection receipt section that receives from a user a selection of the recovery point desired by the user and a recovery request section that transmits a recovery execution request that designates the recovery point selected by the user to the recovery execution section. The total transfer data size includes the total journal size of one or more journals that are to be applied to the data group of the data storage device at the corresponding snapshot acquisition time point, for example. Further, the recovery load pertains to the length of the recovery time. For example, the larger is the recovery load, the longer is the recovery time and the smaller is the recovery load, the shorter is the recovery time.

The control device may be implemented as a controller that is integrated in the storage system or may be a computer that is capable of communicating with the storage system. Further, a portion of the plurality of constituent elements that the control device comprises may be in the controller of the storage system while the remaining portion may be in the computer.

Each of the above storage regions can be provided, for example, in the storage resource (memory or hard disk or the like, for example). Further, the respective components of the inventive system may be implemented using hardware, a computer program, or a combination thereof (for example, a portion of the respective components may be implemented by a computer program while the remainder of the components may be implemented by hardware). The aforesaid computer program implementing at least a portion of the inventive system may be read by a predetermined processor and executed. Further, a storage region that exists in a hardware resource such as memory may be suitably used during the information processing that is performed when the computer program is read by the processor. In addition, the computer program may be installed on a computer from a recordable medium such as a CD-ROM or downloaded to a computer via a communication network.

BRIEF DESCRIPTION OF THE DRAWINGS

FIG. 2 shows an example of a journal group table according to the first embodiment;

FIG. 3 shows an example of a data volume table according to the first embodiment;

FIG. 4 shows an example of a snapshot volume management table according to the first embodiment;

FIG. 5 shows an example of an SSVOL group management table according to the first embodiment;

FIG. 6 shows an example of a journal volume table according to the first embodiment;

FIG. 7 shows an example of journal management data according to the first embodiment;

FIG. 11 shows an example of a data volume table according to a second embodiment;

FIG. 12 shows an example of a snapshot volume management table according to the second embodiment;

FIG. 13 shows an example of a journal volume table according to the second embodiment;

FIG. 16 shows an example of an SSVOL group management table according to a third embodiment;

FIG. 18 shows an example of a recovery policy according to the fourth embodiment;

FIG. 21 shows an example of a GUI that is displayed by the fourth embodiment and which represents the relationship between one or more selectable recovery point candidates obtained by filtering the plurality of recovery points and the journal application amount;

DETAILED DESCRIPTION OF THE PREFERRED EMBODIMENTS

Several embodiments of the present invention will be described hereinbelow with reference to the attached drawings. However, the present invention is not limited by such described embodiments.

First Embodiment

System Constitution of First Embodiment

Figure 1:
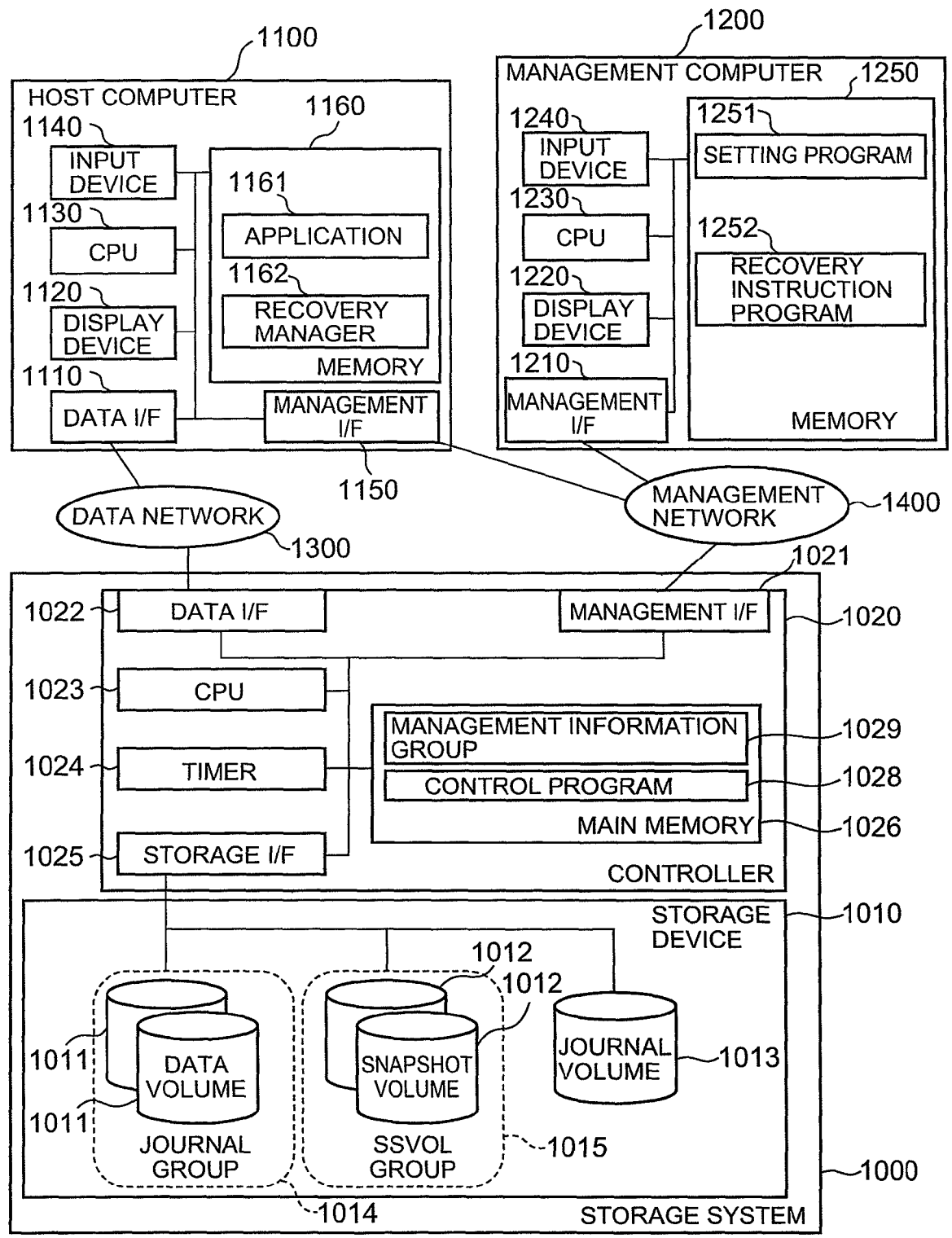
FIG. 1 shows an exemplary embodiment of a computer system according to a first embodiment.

FIG. 1 is a block diagram showing an exemplary architecture of the computer system according to a first embodiment of the present invention.

In this system, the storage system 1000 and host computer 1100 are interconnected via a data network 1300. In this embodiment, the data network 1300 is a storage area network but may also be an IP network or another data communication network.

The storage system 1000, host computer 1100, and management computer 1200 are mutually connected via a management network 1400. In this embodiment, the management network 1400 is an IP network but may also be a storage area network or another data communication network. Further, the data network 1300 and management network 1400 may also be the same network or the host computer 1100 and management computer 1200 may also be the same computer.

Further, for the sake of convenience in the description, there is one storage system 1000, one host computer 1100, and one management computer 1200 in FIG. 1. However, a greater number thereof may be installed in the present invention.

The storage system 1000 is constituted by a plurality of storage devices 1010 that store data and a controller 1020 that performs control in the storage system 1000.

A variety of storage devices such as a hard disk drive and a flash memory or the like can be adopted as the storage device 1010. Different types of the storage device 1010 may also exist in the storage system 1000. Groups (RAID groups) that conform to RAID (Redundant Array of Independent (or Inexpensive) Disks) regulations can be constituted by two or more storage devices 1010. One or more logical volumes can be prepared using the storage space of the RAID group. One or a plurality of the logical volumes are provided in a plurality of storage devices 1010 and can comprise, for example, a journal group 1014, an SSVOL group 1015, and a journal volume 1013. There may also be one storage device 1010.

The journal group 1014 is constituted by one or more data volumes 1011. The data volume 1011 is a logical volume that stores data used by the host computer 1100. Further, the journal group 1014 has one or more journal volumes 1013 and one or more SSVOL groups 1015 associated therewith. The journal volume 1013 is a logical volume that stores the journals and markers. Markers are data for recording times when a variety of events occur and are used as indices for selecting recovery points when recovery is performed. The SSVOL group 1015 will be described subsequently.

A write request from the host computer 1100 to the data volume 1011 is processed by a CPU 1023 that executes a control program 1028 (described subsequently) and the data that conforms to the write request is written to the data volume 1011. Thereupon, the CPU 1023 creates a journal by assigning suitable management metadata, i.e. by making write data an after journal and data of the overwritten places a before journal and distributing sequential numbers in accordance with the transmitted sequence. Further, the CPU 1023 stores the journals in the journal volumes 1013 associated with the journal group 1014 to which the data volume 1011 belongs. The metadata and sequential numbers will be described subsequently together with the constitution of the journals. Further, when the storage region of the new journal is insufficient, the CPU 1023 is able to store the journal after creating a blank space by deleting the oldest journal from the journal volume 1013. Further, as one modified example, during processing of the write request by the host computer 1100, the CPU 1023 may be constituted to create a journal that holds either an after journal or a before journal.

The SSVOL group 1015 is constituted by one or more snapshot volumes 1012. The snapshot volume 1012 is a logical volume that stores a duplicate image (snapshot) of the data volume 1011 at a certain time. Further, in this embodiment, the snapshot stored in the snapshot volume 1012 may be a full backup of the data volume 1011 or may be a logical image such as a differential backup.

Further, the constitutional information is managed as a management information group 1029 by the CPU 1023 that executes the control program 1028 of the controller 1020 (described subsequently).

The controller 1020 comprises a management I/F 1021, a data I/F 1022, a storage I/F 1025, a main memory 1026, a CPU 1023 and a timer 1024.

A management information group 1029 and control program 1028 are stored in the main memory 1026. The CPU 1023 executes the control program 1028 which is a computer program stored in the main memory 1026.

As a result of the control program 1028 being executed by the CPU 1023, a variety of processes, such as, for example, snapshot acquisition, journal creation, recovery using the journal, and the opening of the journal are performed. Hereinbelow, when the computer program is the subject, processing is executed by the CPU that actually executes the computer program. The control program 1028 is capable of processing the inputs and outputs of data with respect to the storage device 1010 in accordance with requests from the management computer 1200 and host computer 1100 and setting the constitution of the storage system 1000. The setting of the constitution of the storage system 1000 includes setting the information representing which logical volume is provided by which storage device 1010, for example. The information representing the constitution settings is included in the management information group 1029. The control program 1028 references the management information group 1029 and is able to execute the earlier mentioned variety of processes based on the information in the management information group 1029. The composition of the information group 1029 will be described subsequently.

The timer 1024 can be a general timer with a function for providing the current time. The timer 1024 is referenced by the control program 1028 when a journal is created or a snapshot is acquired.

The data I/F 1022 is an interface device for the data network 1300 that holds one or more communication ports. The controller 1020 sends and receives data and control commands and so forth to and from the host computer 1100 (and/or other storage systems) via the port. The management I/F 1021 is an interface device with the management network 1400 that sends and receives data and control commands to and from the host computer 1100 and management computer 1200. The storage I/F 1025 is an interface device for the storage device 1010 that sends and receives data and control commands and so forth.

The host computer 1100 comprises an input device (keyboard and mouse and so forth, for example) 1140, a CPU 1130, a display device (a CRT (Cathode Ray Tube) or liquid crystal display, for example) 1120, a memory 1160, a data I/F 1110, and a management I/F 1150.

The data I/F 1110 is an interface device for the data network 1300 and comprises one or more communication ports. The host computer 1100 sends and receives data and control commands and so forth to and from the storage system 1000 via the port. The management I/F 1150 is an interface device for the management network 1400 that sends and receives data and control commands and so forth to and from the management computer 1200 and storage system 1000 for system management (need not be limited to system management).

A plurality of computer programs, such as, for example, an application 1161 and a recovery manager 1162, are stored in the memory 1160. The CPU 1130 is able to implement the respective functions by executing a variety of programs stored in the memory 1160.

The application 1161 is an application program that uses a data volume 1011 and is a DBMS (database management system) or file system, for example.

The recovery manager 1162 issues a request for quiescence of the application 1161 and for the acquisition of a snapshot for the storage system 1000, as well as a data recovery request for data of a specified time. Further, the recovery manager 1162 issues a request to insert a marker in the storage system 1000 in accordance with quiescence of an application, another event, or an instruction from the administrator. The marker is used as an index for selecting a recovery point when performing recovery. A 'recovery point' signifies a certain time point in the past when data at a certain time point in the past were recovered. That is, the selection of a recovery point is a choice to recover data at a particular time. A marker is saved in a journal volume 1013 by the control program 1028 as a journal of data length 0 with the same data constitution as the journal. This constitution will be described subsequently together with the constitution of the journal. The recovery manager 1162 provides a command line interface (known as 'CLI' hereinbelow) as the interface so that the administrator and other programs are able to execute these functions.

Further, although there is one application 1163 in FIG. 1 for the sake of convenience, there may be one or more applications 1163 in this embodiment.

The management computer 1200 comprises an input device (a keyboard and mouse and so forth, for example) 1240, a CPU 1230, a display device (a CRT or liquid crystal display, for example) 1220, a memory 1250, and a management I/F 1210.

The management I/F 1210 sends and receives data and control commands and so forth to and from the host computer 1100 and storage system 1000 for system management (need not be limited to system management).

The memory 1250 stores a plurality of programs such as, for example, a setting program 1251 and a recovery instruction program 1252. The CPU 1230 is able to implement the respective functions by executing a variety of programs that are stored in the memory 1250.

The setting program 1251 is a program for setting the value of the management information group 1029. Further, when the value of the management information group 1029 is set, the CPU1230 executing the setting program 1251 is able to communicate with the CPU 1023 executing the control program 1028.

The recovery instruction program 1252 gathers accumulated information on journals and markers and base snapshot acquisition time points from the storage system 1000 in accordance with instructions from the administrator during recovery, supplies an interface permitting visualization of the relationship between the respective times including the various event production times and the journal application amounts required for recovery of data at those times, and issues instructions to the storage system 1000 in order to restore data for the recovery point which is selected by the user by using the visualized interface. The details of this processing will be described subsequently.

Further, the above two programs 1251 and 1252 are able to provide a CLI or the like as an interface so that the administrator and other programs are able to execute the program.

FIGS. 2 to 7 illustrate constitutional examples of various tables or data contained in the management information group 1029. Further, the assignment of reference numbers to the tables in the respective drawings is to indicate columns or fields and not to indicate the values themselves which are stored in the columns or fields. Hence, when a column or field is indicated in the following description, the description is made by assigning a reference number and, when a column or field is not indicated, the description is made without assigning a reference number.

FIG. 2 shows an exemplary embodiment of a journal group table 2000.

Information relating to the journal groups 1014 is recorded in the journal group table 2000. This table 2000 has, for each journal group 1014, the ID of the journal group (JNLG_ID), and a sequence counter, for example. More specifically, for example, the table 2000 has a JNLG_ID 2001 and a sequence counter 2002.

The JNLG_ID 2001 is a column in which the identifier (ID) of the journal group is stored. The identifier is set as a result of the administrator using the CLI provided by the setting program 1251 to create the journal group 1014. For example, the administrator is able to issue a command such as 'CreateJG-jgidJNLG_1'. This is a command such as 'Create journal group JNLG_1' to the storage system 1000. The value of JNLG_1 is stored in JNLG_ID 2001.

Further, in order to perform this setting, the CPU1230 that operates in accordance with the setting program 1251 is able to communicate with the CPU 1023 that operates in accordance with the control program 1028. Communication is established by using the IP address that is registered as the connection destination in the setting information (not illustrated) of the setting program 1251, for example. When, after executing a variety of programs, the CPU1230 communicates with the CPU 1023 that operates in accordance with the control program 1028, a description of the processes performed after establishing communications as above is omitted. Further, cases where operations are made in accordance with the recovery instruction program 1252 are also similar.

The sequence counter 2002 is a column in which a number (sequential count value) for managing the sequence for journal creation is stored. The initial value of the sequential count values stored in the sequence counter 2002 is 0. However, every time a journal is created in response to a write request from the host computer 1100, the sequential count value is updated by a predetermined value equivalent by the control program 1028. 1 is added, for example. The incremented sequential count value is then copied to a sequential number 7005 of a journal to be described subsequently. Further, the sequential number of the journal is copied to the sequential number 5005 of the SSVOL group management table (described subsequently) by the control program 1028 each time a snapshot is acquired. As a result of this processing, the sequential relationship of the respective journal creation timing and the snapshot acquisition timing are recorded by the processing. During recovery, the control program 1028 uses the sequential relationship to be able to specify the journal and the application sequence to be applied to the base snapshot. More specifically, when recovery is performed by applying an after journal to a specified snapshot, for example, the control program 1028 applies a journal that has a journal sequential number that is larger than the journal sequential number at the time of acquisition of the snapshot and which is no more than the journal sequential number of the designated recovery point in accordance with the journal sequential number of the journal. Conversely, when the before journal is applied to the specified snapshot, the control program 1028 applies, in order starting with the largest journal sequential number of the journals, respective journals with journal sequential numbers that are smaller than the journal sequential number upon acquisition of the snapshot or equal to or greater than the journal sequential number of the designated recovery point.

FIG. 3 shows an exemplary view of a data volume table 3000.

Information relating to the data volumes constituting the journal groups 1014 is recorded in the data volume table 3000. For example, the JNLG_ID, the IDs of the data volumes belonging to the journal group, and the volume sizes of the data volumes are recorded for each journal group 1014 in the data volume table 3000. More specifically, the table 3000 includes the JNLG_ID 3001, data volume ID 3002, and size 3003.

JNLG_ID 3001 is a column in which the identifiers of the journal groups are stored.

Data volume ID 3002 is a column in which the identifiers of the logical volumes (data volumes) are stored. Each entry (cell) of the column stores the IDs of the logical volumes belonging to the journal group to which the JNLG_ID to which the entry corresponds is allocated.

The size 3003 is a column in which the sizes of the logical volumes are stored. Each entry (cell) of the column stores the volume size of the logical volume to which the data volume ID to which the entry corresponds is allocated.

These values can be set as a result of the administrator using the CLI provided by the setting program 1251 to add data volumes to the journal group. For example, the administrator is able to issue the command 'addDataVOL-jgid-JNLG_1-datavolid LU_11'. This is a command to 'Add the data volume LU_11 to the journal group JNLG_1' that is issued to the storage system 1000. This JNLG_1 is stored in the JNLG_ID 6001 and the LU_11 is stored in the data volume ID 6002. Further, thereupon, the size of the LU_11 managed by the CPU 1023 that operates in accordance with the control program 1028 is set in the size 3003. When a plurality of data volumes are established in a single journal group, the command can be executed a plurality of times.

FIG. 4 shows an exemplary embodiment of a snapshot volume management table 4000.

Information relating to the snapshots constituting the SSVOL group 1015 is recorded in the snapshot volume management table 4000. For example, the IDs of the SSVOL group, the IDs of the snapshot volumes belonging to the SSVOL group, and the IDs of the data volumes associated with the SSVOL group are stored for each SSVOL group (snapshot volume group) 1015. More specifically, for example, the table 4000 has an SSVOL group ID 4001, a snapshot volume ID 4002, and a corresponding data volume ID 4003.

The SSVOL group ID 4001 is a column in which the identifiers of the SSVOL groups constituting management targets are stored.

The snapshot volume ID 4002 is a column in which the identifiers of the logical volumes (snapshot volumes) are stored. Each entry (cell) of the column stores the ID of the snapshot volume belonging to the SSVOL group to which the SSVOL group ID to which the entry corresponds is allocated.

The corresponding data volume ID 4003 stores the identifiers of data volumes constituting snapshot acquisition targets. Each entry (cell) of the column stores the ID of a data volume associated with the SSVOL group to which the SSVOL group ID to which the entry corresponds is allocated.

These values can be set as a result of the administrator using the CLI provided by the setting program 1251 to add a logical volume constituting a snapshot volume to the SSVOL group, for example. For example, the administrator issues the command 'addSSVOL-ssvolgidSSG_1-ssvolidLU_21-source LU_11'. This is a command to 'Add a snapshot volume LU_21 for storing a snapshot of the data volume LU_11 to the 'SSVOL group SSG_1' that is issued to the storage system 1000. The SSG_1 is stored in the SVOL group ID 4001, the LU_21 is stored in the snapshot volume ID 4002, and LU_11 is stored in the corresponding data volume ID 4003.

FIG. 5 shows an exemplary embodiment of a SSVOL group management table 5000.

Information relating to the associations between the journal groups 1014 and SSVOL groups 1015 is recorded in the SSVOL group management table 5000. For example, the ID of the journal group, the ID of the SSVOL group corresponding to the journal group, the sequential number of the snapshot corresponding to the SSVOL group, and the acquisition time of the snapshot are recorded for each journal group 1014. More specifically, this table 5000 has, for example, a JNLG_ID 5001, an SSVOL group ID 5002, a sequential number 5003, and an acquisition time 5004.

The JNLG_ID 5001 is a column in which the identifiers of the journal groups constituting management targets are stored.

The SVOL group ID 5002 stores identifiers of the SSVOL groups that store the snapshots of the journal groups indicated in JNLG_ID 5001.

These values can be set as a result of the administrator using the CLI provided by the setting program 1251 to associate the SSVOL groups with the journal groups, for example. For example, the administrator issues a command such as 'addSSVOLG-jgid JNLG_1-ssvolgid SSG_1'. This is the command 'Associate the SSVOL group SSG_1 with the journal group JNLG_1' that is issued to the storage system 1000. The JNLG_1 is stored in the JNL group ID 5001 and the value of SSG_1 is stored in the SSVOL group ID 5002. Further, a plurality of SSVOL groups can be associated with a journal group by executing the command a plurality of times by changing the identifier of the SSVOL group of the command.

The sequential number 5003 is a column in which a number (snapshot sequential number) indicating the sequential relationship between the acquisition timing of the snapshot stored in the SSVOL group indicated by the SSVOL group ID 5002 and the journal creation timing is stored. The control program 1028 sets the sequential count value of the sequence counter 2002 in the sequential number 5003 when the snapshot is stored. That is, the snapshot acquisition number stored in the sequential number 5003 is a number indicating the snapshots stored up until a journal with a particular journal sequential number.

The acquisition time 5004 is a column in which the time (snapshot acquisition time) when the snapshot acquisition request arrives at the storage system 1000 is stored. The control program 1028 acquires the current time from the timer 1024 and sets the acquired current time in the acquisition time 5004. Further, as a modified example, the request issue time contained in the snapshot acquisition request may be set in the acquisition time 5004. The request issuance time may also be used in a mainframe environment, for example, because a plurality of mainframe hosts share the timer and are able to provide the times when a snapshot acquisition request is issued.

FIG. 6 shows an exemplary embodiment of a journal volume table 6000.

Information relating to the journal volumes associated with journal group is recorded in the journal volume table 6000. For example, the ID of the journal group, the ID of the JNL volume associated with the journal group, and the usage sequence of the JNL volumes are recorded for each journal group 1014. More specifically, for example, the table 6000 has a JNLG_ID 6001, a JNL volume ID 6002, and a usage sequence 6003.

JNLG_ID 6001 is a column in which the identifiers of the journal groups are stored.

The JNL volume ID 6002 is a column in which the identifiers of the journal volumes used by the journal group indicated in the JNLG_ID6001 are stored.

The usage sequence 6003 is a column in which numbers used for the storage of journals by the journal volume indicated by the JNL volume ID 6002 are stored.

These values can be set as a result of the administrator using the CLI provided by the setting program 1254, for example, to add the journal volumes to the journal group. For example, the administrator issues a command such as 'addJVOL-jgid JNLG_1-jvolid LU_31'. This is a command to 'Add the journal volume LU_31 to the journal group JNLG_1' that is issued to the storage system 1000. The JNLG_1 is stored in the JNLG_ID 6001 and the LU_31 is stored in the JNL volume ID 6002. Further, a number obtained by adding 1 to the maximum of the usage sequence 6003 of the record with the same value as the value of the JNLG_ID6001 set by the command is stored in the usage sequence 6003. Here, 1 is stored when there is no record with the same value. A plurality of journal volumes can be added to the journal group by executing this process a plurality of times by changing the identifier of the logical volume which is the journal volume of the command.

FIG. 7 shows an exemplary embodiment of the journal management data 7000.

Journal management data 7000 is data for managing journals. Journal management data 7000 exists for each journal and is newly created each time a journal is created. In this embodiment, because a marker is one type of journal, when a marker is created, journal management data 7000 corresponding to the marker is also created. Journal management data 7000 includes, for example, a data volume ID 7001, an application destination address 7002, a data length 7003, a generation time 7004, a sequential number 7005, an after journal storage volume ID 7006, an after journal storage address 7007, a before journal storage volume ID 7008, a before journal storage address 7009, and a comment 7010.

The data volume ID 7001 is a field in which the identifier of the data volume constituting the application destination of the journal is stored.

The application destination address 7002 is a field in which the application destination address in the data volume indicated in the data volume ID 7001 is stored.

The data length 7003 is a field in which the length of the applied data, that is, the data length of the after journal and/or Before journal is stored.

These values are values that are set in accordance with a write request from the host computer 1100 when the CPU 1023 that operates in accordance with the control program 1028 creates a journal. Further, when the journal signifies a marker, NULL is set in the data volume ID7001 and in the application destination address 7002. 0 is set in the data length 7003.

The generation time 7004 holds the time the write request from the host computer 1100 reaches the storage system 1000. The value of the generation time 7004 is acquired and set from the timer 1024 of the controller 1020 by the CPU1023 that operates in accordance with the control program 1028. Further, as a modified example, the write issue time (time stamp) included in the write request may be stored in the generation time 7004.

The sequential number 7005 is a field in which a number indicating the sequential relationship between the acquisition timing of the snapshot and the journal creation timing is stored. When creating a journal, the control program 1028 sets a value obtained by adding one to the sequential count number of the sequence counter 5002 as the sequential number.

The after journal storage volume ID 7006 is a field in which the identifier of the logical volume (journal volume) that stores an after journal is stored.

The after journal storage address 7007 is a field for storing the address of the logical volume indicated by the after journal storage volume ID 7006 (address where the after journal is stored). When creating a journal, the control program 1028 sets these values in accordance with the location where the after journal is stored. Further, when the journal signifies a marker, NULL is set in the after journal storage volume ID 7006 and the after journal storage address 7007.

The before journal storage volume ID 7008 is a field in which the identifier of a logical volume (journal volume) that stores a before journal is stored.

The before journal storage address 7009 is a field that stores the address of the logical volume indicated by the before journal storage volume ID 7008 (the address where the before journal is stored). When creating a journal, the control program 1028 sets these values in accordance with the location that stores the before journal. When the journal signifies a marker, NULL is set in the before journal storage volume ID 7008 and before journal storage address 7009.

The comment 7010 is a field that stores a character string that indicates a specified event. This value is set only when the journal is a marker, for example, and is set in accordance with a request from the recovery manager 1162. When the journal is not a marker, NULL is set in the comment 7010. Naturally, the journal is not limited to a marker and, when the journal is not a marker, for example, a character string indicating a specified event may be stored as a comment.

(2) Operation of Embodiment 1

The operation of this embodiment will be performed next.

Figure 8:
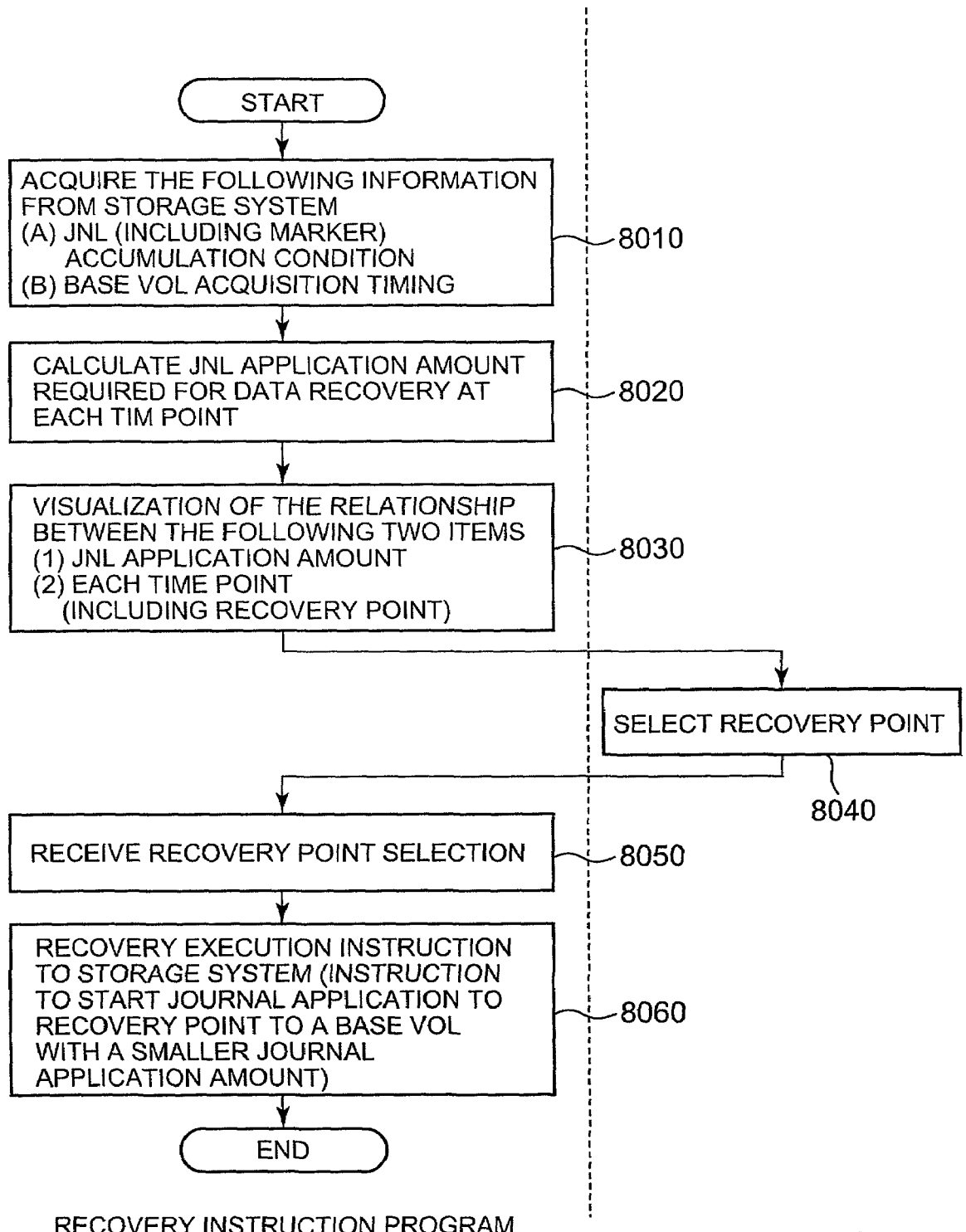
FIG. 8 shows an example of the flow of processing that is executed by a recovery instruction program according to the first embodiment.

FIG. 8 is the flow of processing when the recovery instruction program 1252 issues an instruction for recovery to the storage system 1000 in accordance with an instruction from the administrator.

The administrator activates this processing by using the CLI provided by the recovery instruction program 1252. For example, the administrator issues a command such as 'show-RecoveryConsole-jnlgidJNLG_1'. This is the command 'Open a console for recovering the data of journal group JNLG_1'.

When this processing is activated, the recovery instruction program 1252 acquires accumulated information on journals and markers relating to a journal group (JNLG_1 in the command example above) designated by the administrator and snapshot acquisition timing from the control program 1028 (step 8010). Here, the acquired information is, specifically, information on the SSVOL group management table 5000 and information on the journal management data 7000. Further, in this step, in order to perform communications, communications with the storage system 1000 are established beforehand by using the IP address registered as the connection destination in the setting information of the setting program 1251.

The recovery instruction program 1252 then calculates the journal application amount required for the recovery of data of the respective times that include various event occurrence times (recovery points) (step 8020). In this embodiment, because both before journals and after journals can be applied, in this processing, the total of the data lengths of the journals applied when recovery is performed by taking the immediately previous snapshot of the respective recovery points as the base snapshot and the total of the data lengths of the journals applied when recovery is performed by taking the immediately following snapshot (data volume if none exists) as the base snapshot are compared (the data length is the value stored in the data length 7003). The smaller data value total is then made the journal application amount required for data recovery. Further, as a modified example, in the case of a computer system that holds only after journals as journals, the total of the data lengths of the journals applied when recovery is performed by taking the immediately previous snapshots of the respective recovery points as the base snapshot is then the journal application amount required for data recovery. Similarly, in another modified example, in the case of a computer system that holds only before journals as journals, the total of the data lengths of the journals applied in a case where recovery is performed by taking the immediately previous snapshots of the respective times (data volumes if none exist) as the base snapshot is the journal application amount required for data recovery. In addition, as another modified example, the control program 1028 is able to skip the application of journals other than the ultimately applied journal when there is a need to apply a plurality of journals to the same address of the base snapshot during recovery. In this case, the addition of data lengths of journals other than the ultimately applied journal can be skipped as is also the case when calculating the journal application amount required for recovery of the data of this step.

Thereafter, the recovery instruction program 1252 displays an interface that visualizes the relationship between the journal application amounts required for the recovery of the data between the time points on the display device 1220 in step 8020 (step 8030). This interface is a GUI, for example (graphical user interface). The details will be provided subsequently.

The administrator then selects a recovery point on the displayed interface (step 8040). The recovery instruction program 1252 receives the selection (step 8050).

Thereafter, the recovery instruction program 1252 transmits a request to recover data of the received recovery point (a recovery execution request) to the control program 1028 (step 8060). The control program 1028 that receives the recovery execution request implements recovery. More specifically, the control program 1028 recovers a data group at the designated recovery point by applying journals corresponding to the journal management data for which the generation time is between the corresponding snapshot acquisition time and the designated recovery point to the snapshot at the snapshot acquisition time corresponding to the recovery point designated by the recovery execution request. The recovery execution request may designate the snapshot acquisition time.

The flow of the processing when the recovery instruction program 1252 issues an instruction for recovery to the storage system 1000 was described hereinabove. Further, although the recovery instruction program 1252 calculates the journal application amount in this embodiment, as a modified example, the control program 1028 may calculate the journal application amount and the recovery instruction program 1252 may collect the journal application amount in step 8010. In this case, the processing of step 8020 can be omitted.

Figure 9A:
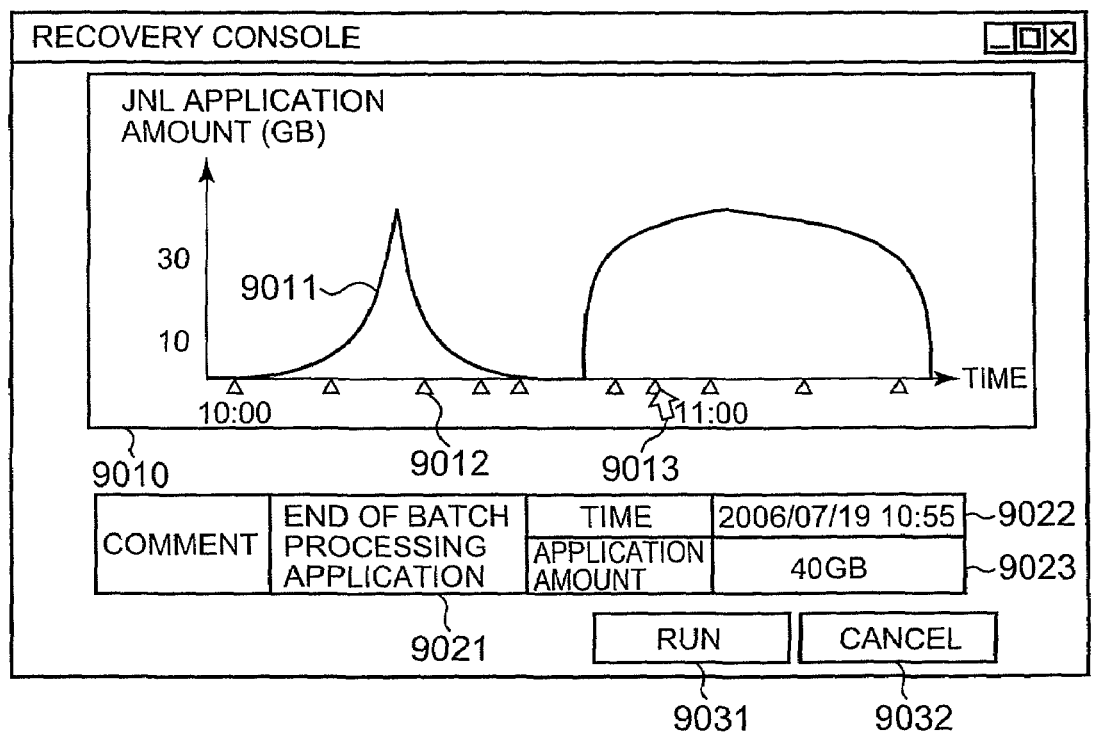
FIG. 9A shows a first example of a first type of GUI that is displayed by the first embodiment.

FIG. 9A is a first example of a first type of GUI that is displayed in step 8030.

This GUI is an example of the earlier mentioned interface that is generated and displayed by the recovery instruction program 1252. A GUI obtained by expressing the relationship between the respective time points that include the respective recovery points and the journal application amounts by means of a two-dimensional graph is called the 'first type of GUI'. On the other hand, a GUI that is obtained by expressing the relationship between the respective time points and the journal application amount is called the 'second type of GUI'. The same is also true in cases where the recovery load information is information other than the journal application amount.

9010 is a two-dimensional graph that shows the relationship between the journal application amounts required for the recovery of data at respective time points that include the respective recovery points. The vertical axis of the graph 9010 represents the journal application amount and the horizontal axis represents the time. 9011 is obtained by using a line to link points found by plotting the journal application amounts required for the recovery of data at the respective recovery points calculated in step 8020. 9012 is an icon that shows the time at which a marker, that is, a recovery point was inserted. The form and color and so forth of this icon may be changed in accordance with the comment 7000 contained in the marker. The marker is inserted at a point where a predetermined event is produced such as when there is an instruction from the user or an error has occurred. 9013 is a pointer that is moved by an input device such as a mouse. In step 8040, pointer 9013 is moved when the user is selecting a recovery point.

9021 is a text field in which a comment included in the marker is displayed using text. When the administrator moves 9013 to a 9012 on the horizontal axis 9010 and clicks, the recovery instruction program 1252 displays the comment contained in the marker corresponding to the 9012, in 9021. Further, when the mouse is clicked on a point on the horizontal axis where a 9012 is not present, there need not by any display at all in 9021.

9022 is a text field in which a recovery point is displayed using text. When the administrator moves 9013 to a point on the horizontal axis 9010 and clicks, the recovery instruction program 1252 displays the time corresponding to this point in 9022 using text.

9023 is a text field that uses text to display the journal application amount required for recovery. When the administrator moves 9013 to a point on the horizontal axis 9010 and clicks, the recovery instruction program 1252 uses text to display the journal application amount required for recovery that corresponds with this point in 9023.

9031 is a button for finalizing the selection of the recovery point. When the administrator pushes this button, a request to recover the data of the time point displayed in 9022 is sent to the recovery instruction program 1252. 9032 is a button for terminating the processing described using FIG. 8. When the administrator pushes this button, a request for termination of the processing described using FIG. 8 is sent to the recovery instruction program 1252. The CPU 1230, which receives this request, then forcibly ends the processing.

Figure 9B:
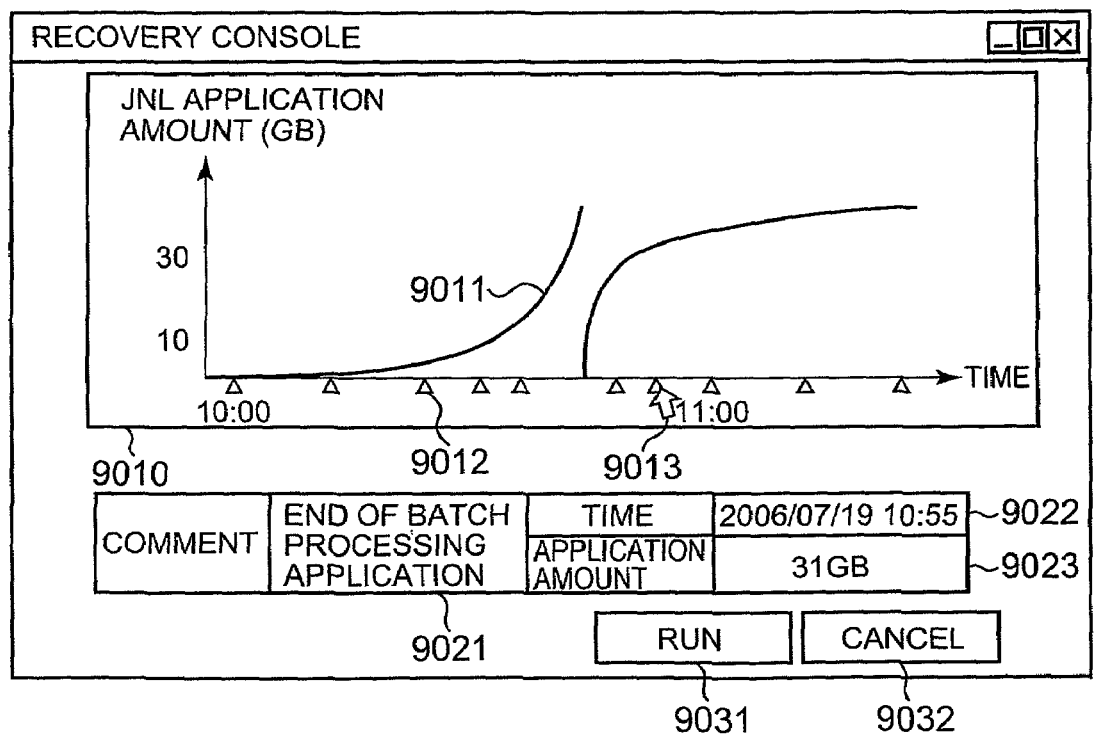
FIG. 9B shows a second example of the first type of GUI.
Figure 22A:
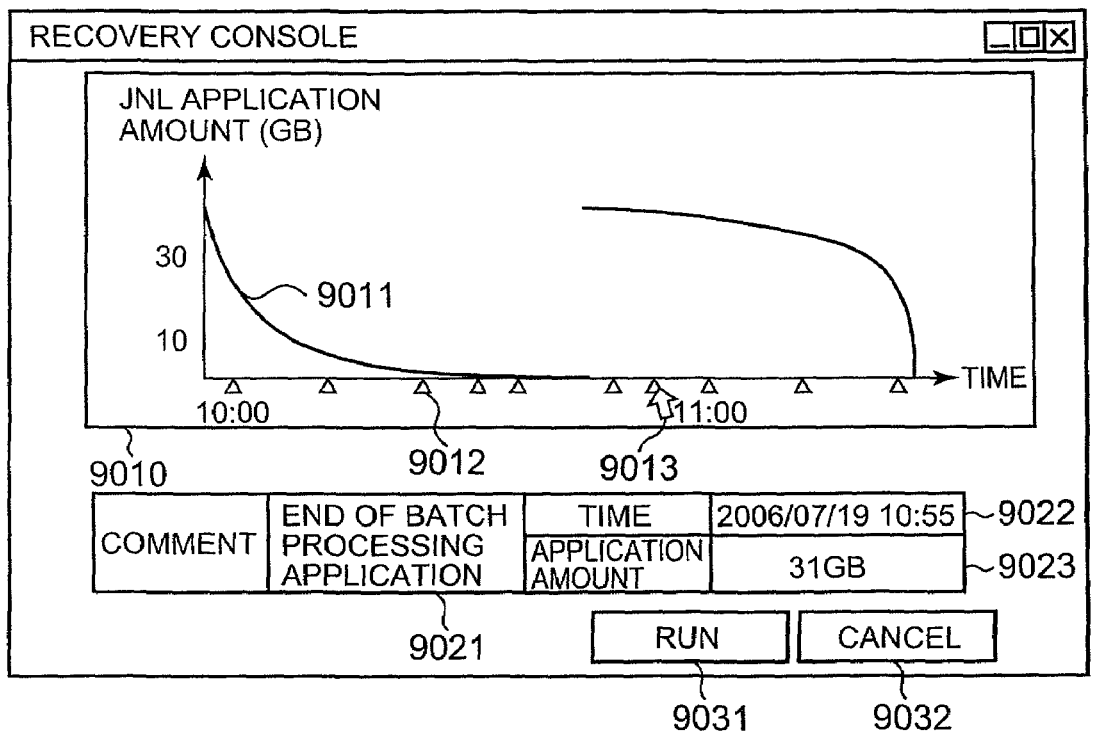
FIG. 22A shows a third example of a first type of GUI that is displayed by the first embodiment.

A first example of the first type of GUI displayed in step 8030 is described above. Further, as a second example of the first type of GUI, when only an after journal is held as a journal, 9010 takes a form of the type shown in FIG. 9B. That is, the peak of the recovery time is not close to the midpoint between the first snapshot acquisition time and the next second snapshot acquisition time and the time closest to the second snapshot acquisition time is the peak of the recovery time. Conversely, for example, when only the before journal is held as a journal, 9010 is as per the illustration in FIG. 22A, for example. That is, the peak of the recovery time does not exist close to the midpoint between the first snapshot acquisition time and the next second snapshot acquisition time and the time point closest to the first snapshot acquisition time is the peak of the recovery time.

Further, the gradient of line 9011 between the respective time points differs according to the total of the data lengths of the journals written between the time points. That is, between time points of the same length, when the total is large, the gradient is large and when the total is small, the gradient is then small.

Figure 10A:
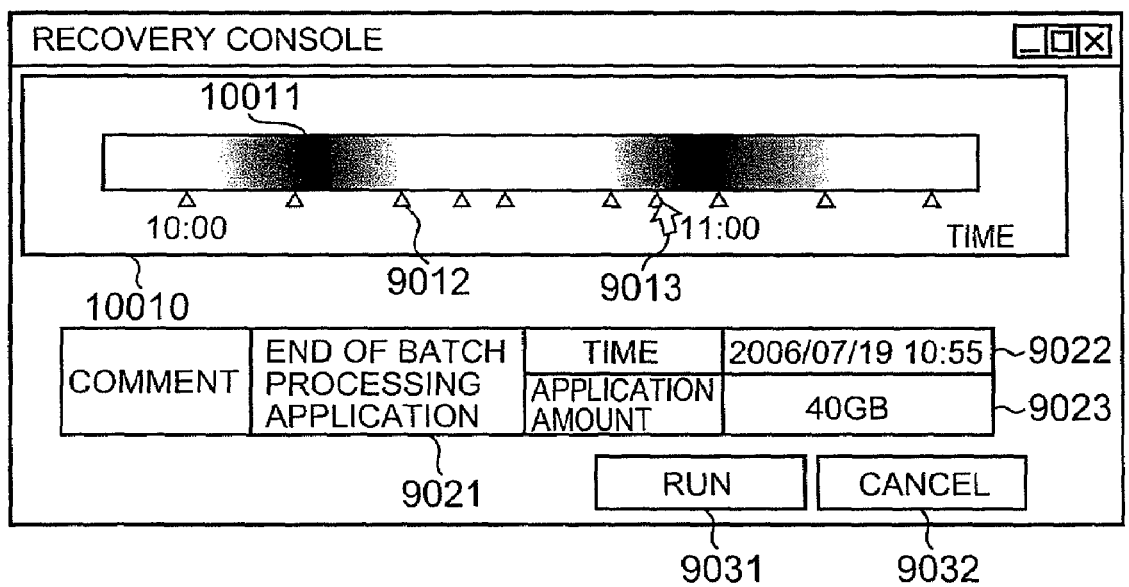
FIG. 10A shows a first example of a second type of GUI that is displayed by the first embodiment.

FIG. 10A is a first example of a second type of GUI that is displayed in step 8030. This GUI is the same as the first type of GUI except for the display form for the relationship between the respective recovery points and journal application amounts. Hence, only the display form of this relationship will be described hereinbelow.

In this GUI, a display area 10010 is displayed instead of a two-dimensional graph 9010. This display area 10010 contains a bar 10011 that represents the journal application amount required for the recovery the data of the respective time points. The horizontal axis of the bar represents the time and the internal color indicates the application amount of the journal. The method of coloring the bar is as follows, for example. The recovery instruction program 1252 searches for the maximum value of the journal application amounts required for the recovery of data at the respective time points calculated in step 8020. Taking 256 as the maximum value, the proportion K1 of the journal application amount required for data recovery at the respective time points is found. Further, the colors of the respective time points (R, G, B) are colored such that (R, G, B)=(256, 256-K1, 256-K1) (RGB is an abbreviation for red, green and blue which are the three primary colors of light). As a result, a bar that grows redder with an increasing journal application amount can be created. Further, the coloring method is not limited to this method and other methods can be adopted. Further, the display is not limited to color. Rather, a display in another form such as a display with a texture or pattern or the like may also be provided. In the display area 10010, 9012 and 9013 are the same as in FIG. 9A.

Figure 10B:
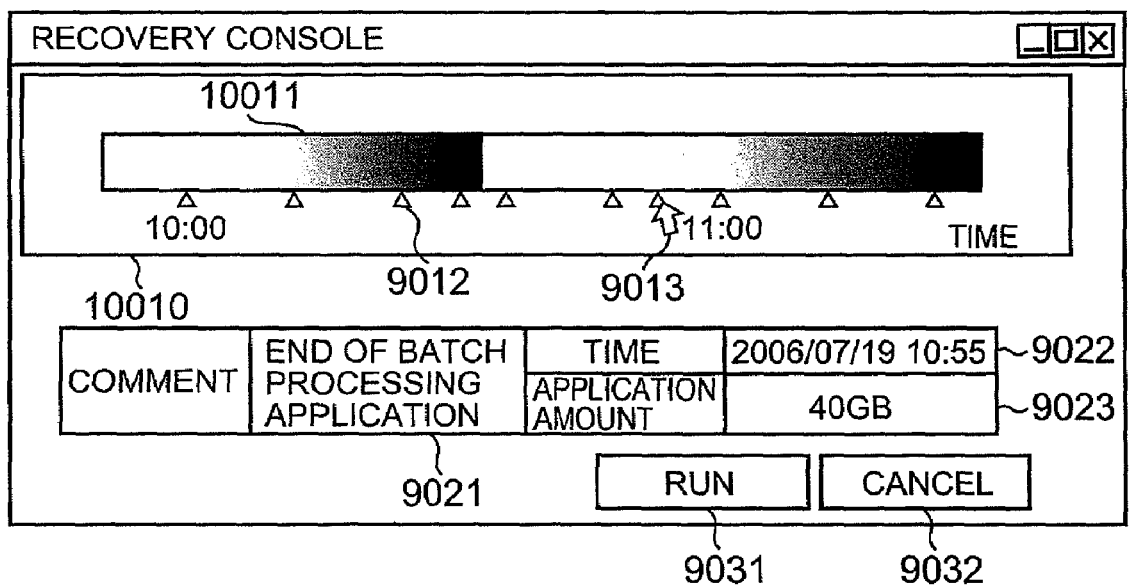
FIG. 10B shows a second example of the second type of GUI.

A first example of the second type of GUI displayed in step 8030 was provided above. Further, when only an after journal is held as a journal in a second example of the second type of GUI, 10010 is as per FIG. 10B. That is, if the peak of the recovery time is closer to the second snapshot acquisition time between the first snapshot acquisition time and the next second snapshot acquisition time, the bar grows redder because the journal application amount to be applied to the first snapshot acquired at the first snapshot acquisition time is greater.

Although examples of the first and second types of GUI are shown in FIGS. 9A, 9B, 10A, 10B and 22A, the method of representing the relationship between the respective recovery points and journal application amount is not limited to the methods of these examples.

A first embodiment was described hereinabove. According to the first embodiment, an interface that visualizes the relationship between the respective recovery points and journal application amount can be provided to the administrator. Hence, the administrator is able to grasp whether recovery can be performed in a shorter recovery time if a particular recovery point is selected. Hence, recovery points with which the recovery time is kept short can be selected.

Second Embodiment

A second embodiment will be described next. Further, the following description mainly describes the differences from the first embodiment and the description of the points in common with the first embodiment are omitted or simplified (the same is also true of the third and subsequent embodiments).

An example where the relationship between the respective time points including the respective recovery points and the journal application amounts required for the recovery of the data of the respective time points is visualized was shown in the first embodiment. In this embodiment, an example where the relationship between the respective time points and recovery times is visualized when the journal application performance can be acquired is shown.

The System Constitution of the Second Embodiment

Because the majority of the system constitution of this embodiment is the same as that of the first embodiment, the differences will be mainly described hereinafter.

FIG. 11 is an example of the data volume table 3000 of the second embodiment.

In this embodiment, the Write capability 11004 has been newly added. The Write capability 11004 is a column in which the write capability of the logical volume indicated in the data volume ID 3002 is stored. The administrator performs a write capability test beforehand, for example, and is able to enter the average value of the write capability as the write capability. As a modified example, the capability of the logical volume may be monitored and this value may be changed in real time.

This value can be set as a result of the administrator using the CLI provided by the setting program 1251, for example. For example, the administrator is able to issue the command 'setDataVOLPerformance-datavolid LU_11-performance 200 Mbps'. This is the command 'Set the write capability of the data volume LU_11' as 200 Mbps that is issued to the storage system 1000. This 200 Mbps is stored in the Write capability 11004.

FIG. 12 is an example of a snapshot volume management table 4000 in the second embodiment.

In this embodiment, Write capability 12004 is newly added. Write capability 12004 is a column that stores the write capability of the logical volume indicated by the snapshot volume ID 4002. The administrator performs a write capability test beforehand, for example, and is able to enter the average value thereof as the write capability. As a modified example, the capability of the logical volume may be monitored and this value may be changed in real time.

This value can be set as a result of the administrator using the CLI provided by the setting program 1251, for example. For example, the administrator is able to issue the command 'setSSVOLPerformance-ssvolid LU_21-performance 200 Mbps'. This is the command 'Set the write capability of the snapshot volume LU_21' as 200 Mbps that is issued to the storage system 1000. This 200 Mbps is stored in the Write capability 12004.

FIG. 13 is an example of a journal volume management table 6000 in the second embodiment.

In this embodiment, Read capability 13004 is newly added. Read capability 13004 is a column that stores the read capability of the logical volume indicated by the JNL volume ID 6002. The administrator performs a read capability test beforehand, for example, and is able to enter the average value thereof as the read capability. As a modified example, the capability of the logical volume may be monitored and this value may be changed in real time.

This value can be set as a result of the administrator using the CLI provided by the setting program 1251. For example, the administrator is able to issue the command 'setJNLVOLPerformance-ssvolid LU_31-performance 400 Mbps'. This is a command to 'Set the Read capability of the 'journal volume LU_31 as 400 Mbps' that is issued to the storage system 1000. This 400 Mbps is stored in the Read capability 13004.

(2) Operation of Second Embodiment

The operation of this embodiment will be described next. The majority of the operation of this embodiment is the same as that of the first embodiment. Hence, the differences will be mainly described hereinafter. More specifically, the flow of the processing of the recovery instruction program 1252 is substantially the same as that of the first embodiment and, therefore, the flow of the processing will be described by using FIG. 8.

In step 8010, in addition to the information of the SSVOL group management table 5000 and the information of the journal management data 7000, the recovery instruction program 1252 acquires the data volume table 3000, the snapshot volume management table 4000, the SSVOL group management table 5000, and the journal volume table 6000 from the control program 1028.

Thereafter, in step 8020, the recovery instruction program 1252 calculates the time taken to recover the data of the respective time points including the respective recovery points (recovery time) instead of the journal application amounts instead of the journal application amounts.

In this processing, the recovery instruction program 1252 first enumerates the journal management data applied when recovery is performed by taking the snapshots immediately before the respective points as the base snapshot. The recovery instruction program 1252 then assigns data lengths by means of the write capability of the application destination logical volume with respect to the respective journal management data and calculates the journal write time. In addition, the recovery instruction program 1252 assigns data lengths by using the read capability of the volume storing the journals and calculates the journal read time. The larger of the two values is then made the journal application time. The larger of the two values is taken because the reading of the journal from the journal volume and the application of the journal thus read to the application destination logical volume can be performed in parallel. The total of the application times of the respective journals is the recovery time of the after journal.

Thereafter, the recovery instruction program 1252 enumerates the journal management data that are applied when recovery is performed by taking the immediately subsequent snapshot (data volume if none is present) as the base snapshot. The recovery instruction program 1252 then assigns data lengths by means of the write capability of the application destination logical volume with respect to the respective journal management data and calculates the journal write time. Further, the recovery instruction program 1252 assigns data lengths by means of the read capability of the volume storing the journal and calculates the journal read time. The larger of the two values is then made the journal application time. The total of the journal application speeds is the before journal recovery time.

Ultimately, the after journal recovery time and the before journal recovery time are compared and the smaller of the two recovery times is made the recovery time that corresponds with the recovery point.

Further, as a modified example, in the case of a computer system that holds only after journals as journals, the after journal recovery time is then the recovery time that corresponds with the recovery point. Likewise, in another modified example, in the case of a computer system that holds only before journals as journals, the before journal recovery time is made the recovery time that corresponds with the recovery point. In addition, in yet another modified example, the control program 1028 is able to skip journal application other than the journal that is ultimately applied when a plurality of journals are applied to the same address of the base snapshot when recovery is performed. In this case, the calculation of journal application times other than that of the journal that is ultimately applied is skipped as is also the case during the calculation of the time taken for the recovery of data in this step.

The recovery instruction program 1252 then displays an interface that visualizes the relationship between the recovery times between the respective time points in step 8020 (step 8030). This interface example will be described subsequently.

The subsequent processing is the same as that of the first embodiment and a description thereof will therefore be omitted.

The flow of the processing when the recovery instruction program 1252 issues an instruction for recovery to the storage system 1000 was described hereinabove.

Although, in this embodiment, the journal application speed was calculated with the premise that journal read processing from a journal volume and write processing to a base snapshot are performed in parallel, when these two processes are performed successively as a modified example, the journal application time of step 8020 can be calculated as the sum of the journal write time and the journal read time.

In addition, in another modified example, the journal application speed itself may be monitored and the time taken to recovery data may be calculated by assigning the sum total of the data lengths of the journals applied with the average value of the journal application speed.

Figure 14A:
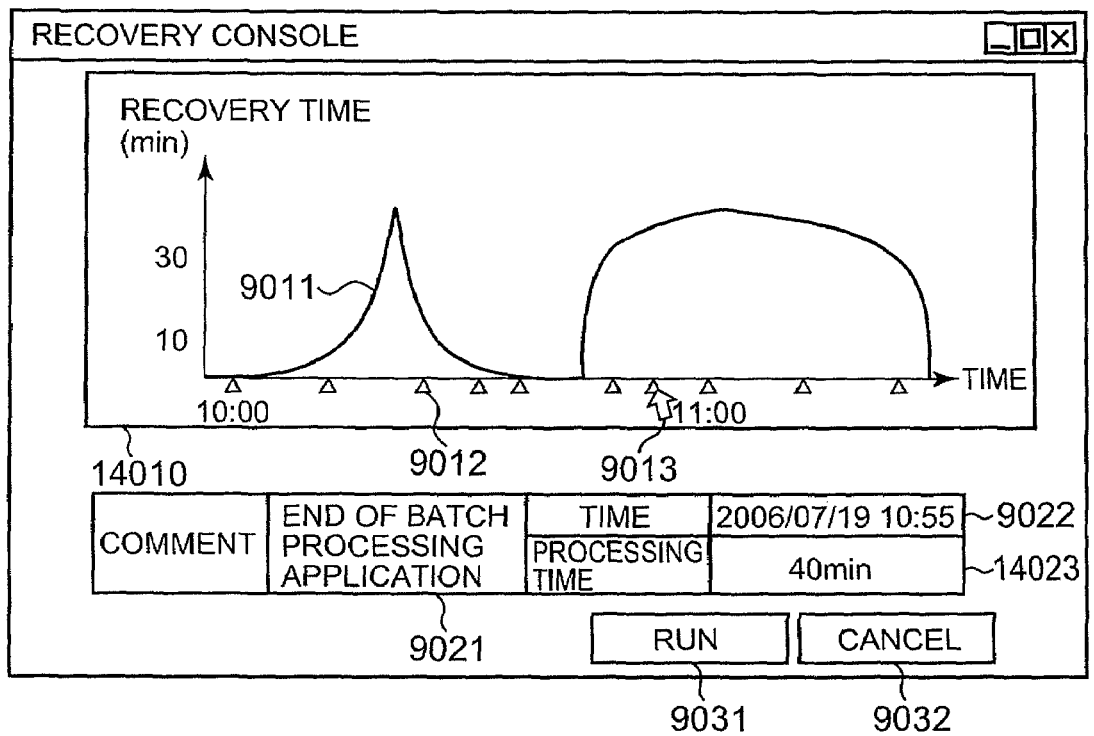
FIG. 14A shows a first example of a first type of GUI that is displayed by the second embodiment.

FIG. 14A is a first example of a first type of GUI of the second embodiment.

This GUI is substantially the same as the GUI of FIG. 9A in the first embodiment and, therefore, the differences will be mainly described hereinbelow.

In this embodiment, a two-dimensional graph 14010 that shows the relationship between the respective time points including the respective recovery points and the recovery times is displayed in place of two-dimensional graph 9010. The vertical axis of the graph shows the recovery time and the horizontal axis shows the time. 9011 is obtained by using a line to link points obtained by plotting the recovery time at the respective time points calculated in step 8020. 9012 and 9013 are the same as in FIG. 9A of the first embodiment.

Furthermore, this GUI displays a text field 14023 in which the recovery time is displayed using text instead of the text field 9023 that displays the journal application amount required for recovery. When the administrator moves 9013 to a point on the horizontal line 9010 and clicks, the recovery instruction program 1252 displays the recovery time corresponding to this point in the text 14023.

Figure 14B:
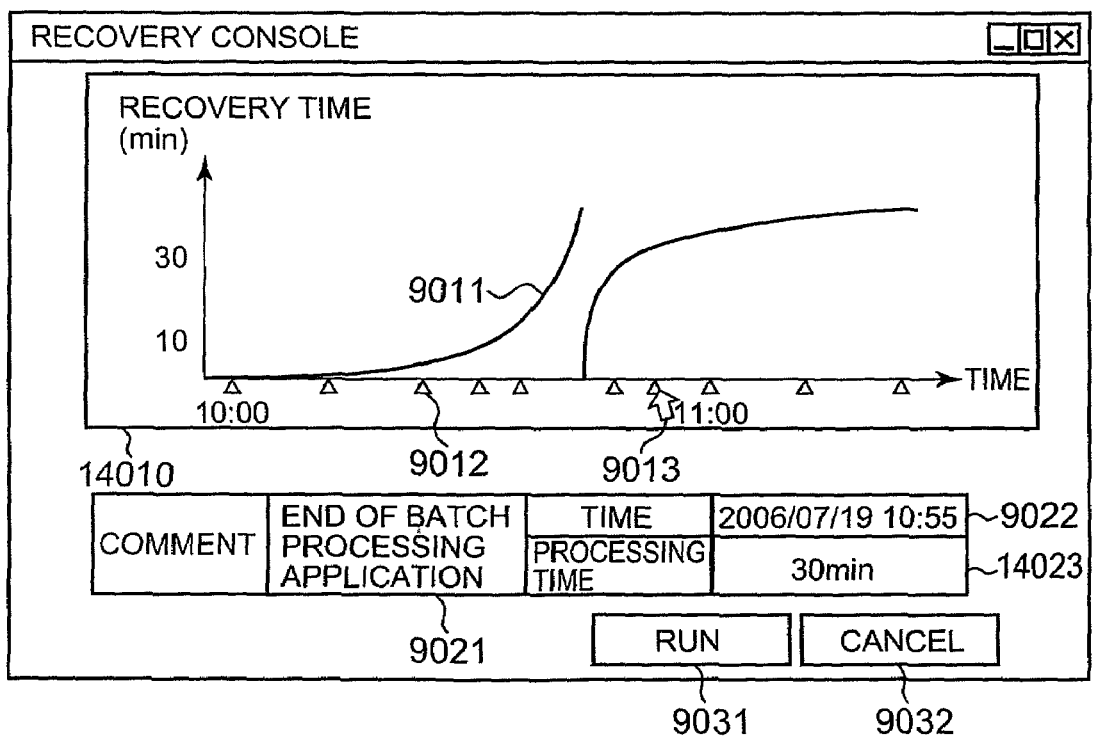
FIG. 14B shows a second example of the first type of GUI.

An example of the GUI displayed in step 8030 was described above. Further, when only after journals are held as journals as a modified example, 14010 is as exemplified in FIG. 14B, for example. When only before journals are held as journals as a modified example, although not especially illustrated, in 14010, 9011 has a form that is obtained by laterally inverting 9011 illustrated in FIG. 14B, for example.

Figure 15A:
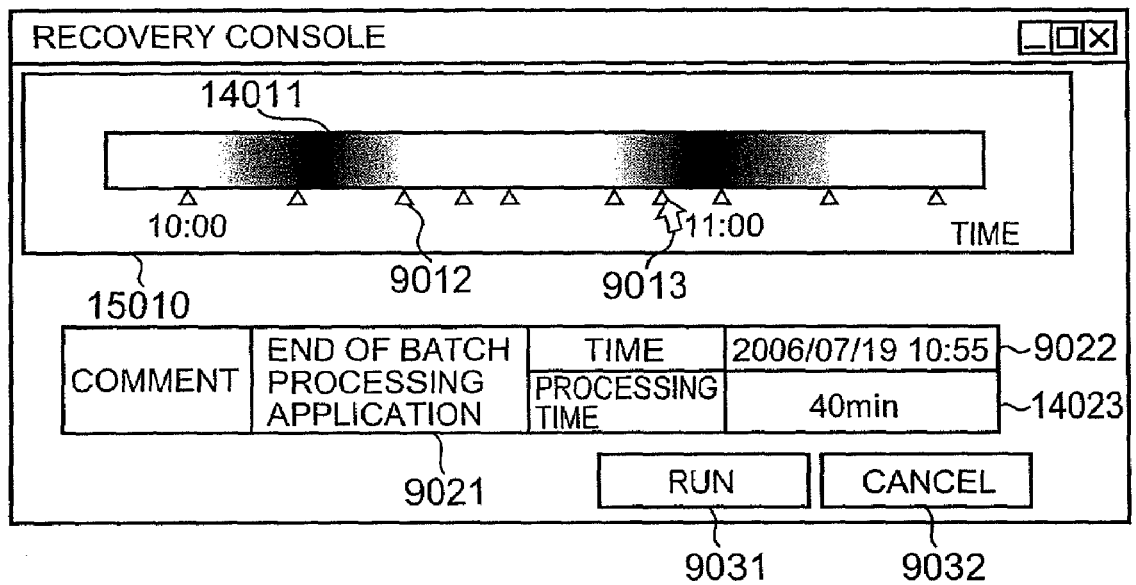
FIG. 15A shows a first example of a second type of GUI that is displayed by the second embodiment.

FIG. 15A is a first example of a second type of GUI of the second embodiment. Further, the majority of this GUI is the same as that of FIG. 14A and, therefore, mainly the differences will be described hereinafter.

This GUI displays a display area 15010 that shows the relationship between the respective time points including respective recovery points, and the recovery times instead of the two-dimensional graph 14010. The display area 15010 includes a bar 15011 that represents the recovery time for each time point. The horizontal axis of this bar represents the time while the color inside the bar represents the recovery time. The method of coloring the bar is as follows, for example.

The maximum value of the recovery times at the respective time points calculated in step 8020 is sought. Taking 256 as the maximum value, the proportion K2 of the recovery times at the respective time points is found. Further, the colors of the respective time points (R, G, B) are colored such that (R, G, B)=(256, 256-K2, 256-K2) (RGB is an abbreviation for red, green and blue which are the three primary colors of light). As a result, a bar that grows redder with an increasing recovery time can be created. 9012 and 9013 are the same as in FIG. 14A.

A first example of the second type of GUI displayed in step 8030 was provided above.

Figure 15B:
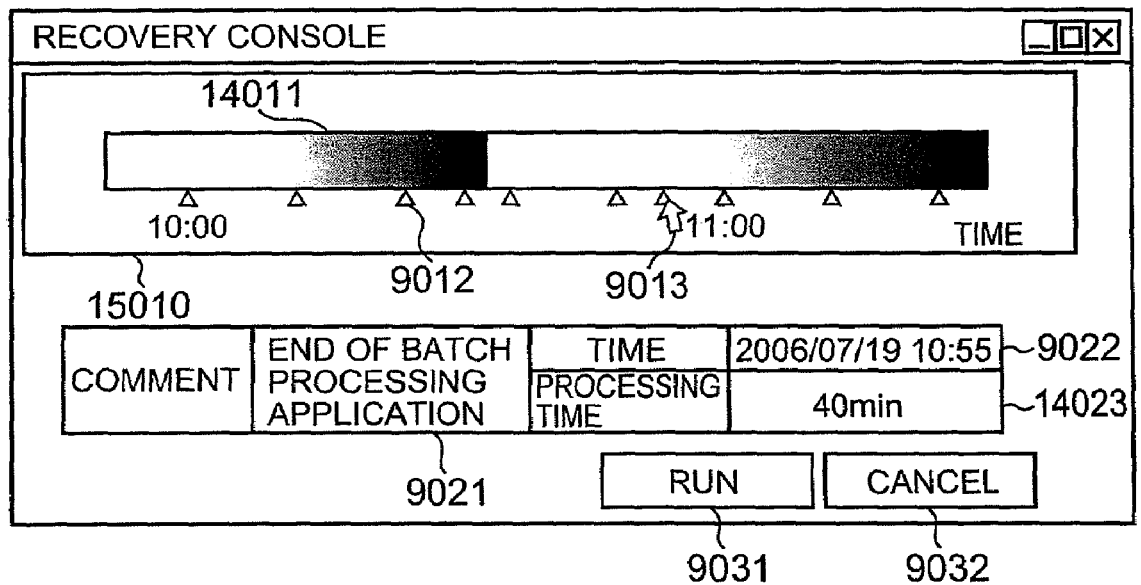
FIG. 15B shows a second example of the second type of GUI.
Figure 17:
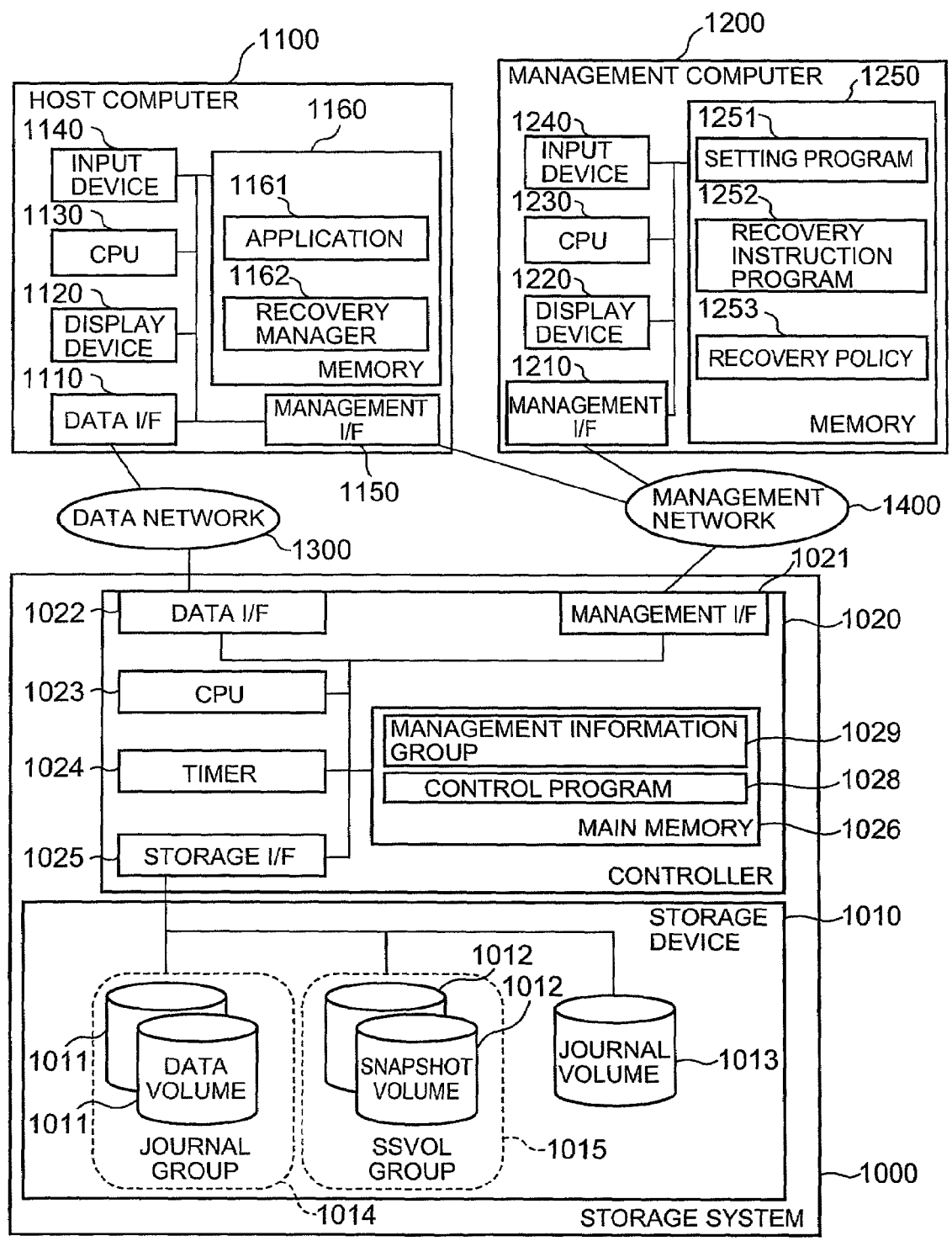
FIG. 17 shows an exemplary embodiment of a computer system according to a fourth embodiment.

Further, as a modified example, when only after journals are held as journals, 15010 is as illustrated in FIG. 15B, for example.

Although examples of the interface of this embodiment were shown in FIGS. 14A, 14B, 15A, and 15B, the method of showing the relationship between the respective time points including respective recovery points, and the recovery times are not limited to such examples.

The second embodiment was described hereinabove. According to the second embodiment, when the journal application capability can be acquired, an interface that visualizes the relationship between the respective time points and recovery times can be provided to the administrator. Hence, when there exist a plurality of recovery points for recovering the desired data, the administrator is able to accurately select the recovery point with the shortest recovery time from among the plurality of recovery points. Hence, the recovery time can be kept short.

Third Embodiment

The third embodiment will be described hereinbelow. In the first embodiment, direct journal application to the base snapshot was performed during recovery. This embodiment illustrates an applied example of a case where a duplicate of a base snapshot is created in another volume during recovery and a journal is applied to the duplicate.

System Constitution of the Third Embodiment.

The majority of the system configuration of this embodiment is the same as that of the first embodiment and, therefore, mainly the differences will be described hereinafter.

The constitution of the computer system of this embodiment is substantially the same as that of the first embodiment and hence the constitution is described by using FIG. 1.

In this embodiment, the control program 1028 creates a duplicate of the base snapshot to the data volume that is the snapshot acquisition source when data of a specified time point (recovery point) is recovered. Thereupon, the control program 1028 copies all the data to the data volume when the base snapshot is a normal full backup. However, when the control program 1028 manages the difference between the base snapshot and the data volume, a duplicate of the base snapshot is created by copying only the difference. When the base snapshot is a virtual image created by combining the data of the data volume with a set of data of a local snapshot that is overwritten by an overwrite to the data volume following the snapshot acquisition (data that is saved during an overwrite), the duplicate of the base snapshot is created by writing back the saved data to the data volume. In this case, the data in the data volume may be copied to another logical volume and then the saved data may be written back to the other logical volume.

Thus, after creating the duplicate, the control program 1028 performs recovery by applying the journal to the duplicate.

FIG. 16 is an example of an SSVOL group management table 5000 of the third embodiment.

In this embodiment, a snapshot 16005 is added. The snapshot 16005 is a column in which a character string that indicates the type of snapshot is stored. More specifically, when the character string 'full backup' is stored, for example, this means that a full backup is stored in the SSVOL group indicated in the SSVOL group ID5002. When the 'differential management full backup' is stored, this means that the full backup that performs management of the difference between the base snapshot and data volume is stored in the SSVOL group indicated by the SSVOL group ID 5002. When 'snapshot' is stored, this means that a virtual image created by combining the data of the data volume is combined with a set of data at the snapshot acquisition time point that is overwritten by the overwrite to the data volume following the snapshot acquisition is stored in the SSVOL group indicated in the SSVOL group ID 5002.

This value can be set as a result of the administrator using the CLI provided by the setting program 1251 to associate the SSVOL group with the journal group, for example. For example, the administrator issues a command such as 'addSSVOLG-jgid JNLG_1-ssvolgid SSG_1-type full backup'. This is the command 'Associate the SSVOL group SSG_1 that stores the full backup with the journal group JNLG_1' that is issued to the storage system 1000. The JNLG_1 is stored to the JNL group ID8001, the value of SSG_1 is stored in the SSVOL group ID 8002, and the full backup is stored in the snapshot type 16005. Further, a plurality of SSVOL groups can be associated with the journal group by executing this process a plurality of times by changing the identifier of the SSVOL group of the command.

Furthermore, a recovery time copy amount 16006 is added in this embodiment. The recovery time copy amount 16006 is a column in which the data copy amount issued when creating a duplicate of the base snapshot in a data volume during recovery is stored. This value is set as the snapshot acquisition time point and is suitably updated in accordance with the snapshot type. When the snapshot type is a 'full backup', the control program 1028 sets the total of the sizes of the snapshot volumes belonging to the SSVOL group indicated in the SSVOL group ID as this value during snapshot acquisition. A subsequent update of this value is not performed. When the snapshot type is 'differential management full backup' or 'snapshot', the control program 1028 sets this value as 0 during snapshot acquisition. Thereafter, the total of the sizes overwritten each time the data of the snapshot acquisition time point is overwritten is set by writing to the data volume.

Irrespective of the snapshot type, in this embodiment, a data transfer for the creation of a duplicate occurs as well as a journal application data transfer. In this embodiment, the total amount of data transferred for the duplicate creation is added to the journal application capacity. The details will be provided hereinbelow.

(2) Operation of the Third Embodiment

The operation of this embodiment will be described next.

The majority of the operation of this embodiment is the same as the operation of the first embodiment and, therefore, mainly the differences will be described hereinafter.

The flow of the processing of this embodiment when the recovery instruction program 1252 issues an instruction for recovery to the storage system 1000 in accordance with an instruction from the administrator is substantially the same as that of the first embodiment. Hence, the flow of processing will be described by using FIG. 8.

Because step 8010 is the same as that of the first embodiment, a description will be omitted hereinbelow.

Figure 22B:
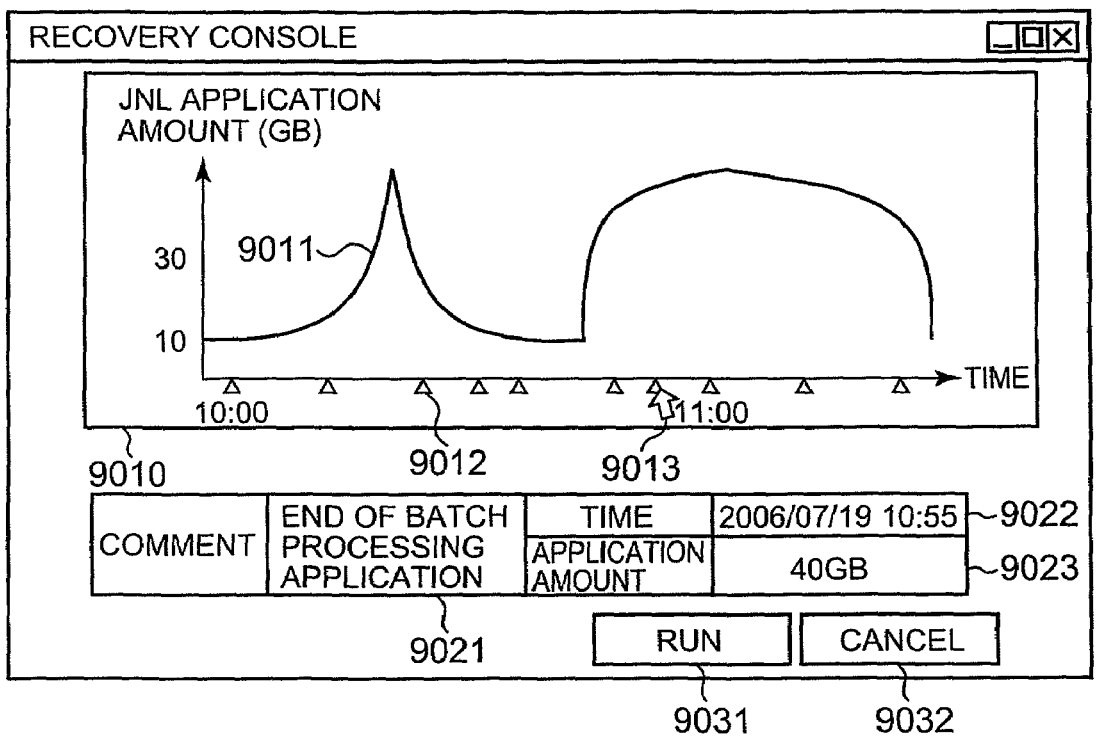
FIG. 22B shows a first example of a first type of GUI that is displayed by the third embodiment.

Thereafter, in step 8020, the recovery instruction program 1252 finds the sum total of the data copy amounts and journal application amounts when a duplicate of the base snapshot is created in the data volume when recovering the data of the respective time points ('total transfer data amount' hereinbelow) (step 8020). That is, this represents the sum total of the journal application amount that represents the calculation method and the recovery time copy amount in the first embodiment. Therefore, for example, in the case of the first example of the first type of GUI in the third embodiment, 9011 is an overall improvement on the 9011 illustrated in FIG. 9A, as illustrated in FIG. 22B. This is because the data copy amount is added to the respective journal application amounts.

Because the steps following step 8030 are the same as those of the first embodiment, a description thereof is omitted.

The third embodiment was described hereinabove. According to the third embodiment, in cases where a duplicate of the base snapshot is created in another volume during recovery and the journal is applied to the duplicate, the interface that visualizes respective time points and total transfer data amounts can be provided to the administrator. Hence, when there exist a plurality of recovery points for recovering the desired data, the administrator is able to accurately select the recovery point with the shortest recovery time from among the plurality of recovery points. Hence, the recovery time can be kept short.

Fourth Embodiment

The fourth embodiment will be described hereinbelow. In the first to third embodiments, a GUI that shows the relationship between respective time points that are successive and include respective recovery points, and the recovery loads (more specifically, the journal application amounts, recovery times, and total transfer data amounts) is displayed. In this embodiment, recovery point candidates that are filtered in accordance with the administrator instruction are listed from among a plurality of recovery points and the recovery point is finally selected from the listed recovery points. The details will be provided hereinbelow.

The system configuration of the fourth embodiment.

The majority of the system configuration of this embodiment is the same as that of the first embodiment. Therefore the differences will be described hereinbelow.

In this embodiment, the memory 1250 of the management computer 1200 stores the recovery policy 1253. The recovery policy 1253 is information that is used by the recovery instruction program 1252 when the recovery instruction program 1252 lists the recovery points in accordance with an instruction from the administrator. In this embodiment, the recovery policy 1253 is stored in a text file format. However, same may be stored in another format as a modified example.

The recovery instruction program 1252 lists recovery point candidates based on the recovery point candidates designated by the recovery policy 1253 and the administrator and supplies the recovery point candidates to the administrator. The recovery point candidates designated by the administrator are called 'first recovery point candidates' and the recovery point candidates listed on the basis of the first recovery point candidates and the recovery policy 1253 are simply called 'recovery point candidates'.

FIG. 18 is an example of a text file of the recovery policy 1253.

One or more conditions are mentioned in the recovery policy 1253. Of the respective conditions, conditions for which the beginning of the line starts with '#' are ignored as comments. That is, the conditions can be selected as valid or invalid depending on whether '#' is assigned to the head of the character string representing the conditions.

Lines that start with 'JNLG_ID' at the beginning of the line indicate a journal group for which a policy is set. The lines up until the line starting with the next 'JNLG_ID' are a policy (set of conditions) for the journal group.

The line starting with 'maximum data loss amount (time) due to data non-update' indicates the permissible time point range as the recovery point. In particular, this line indicates the range of the relative past time with respect to the first recovery point candidate designated by the administrator. More specifically, when the range is registered as 'maximum data loss amount (time) due to data non-update=30 min', for example, the range from the first recovery point candidate designated by the administrator up to and including the time point 30 minutes before is the permissible range.

The line starting with 'maximum data loss amount (time) due to data update' indicates the range of permissible time points as the recovery points. This line in particular indicates the relative future time range for the first recovery point candidates designated by the administrator. More specifically, when the range is registered as 'maximum data loss amount (time) due to data update=30 min', for example, the range from the first recovery point candidate designated by the administrator up to and including the time point 30 minutes thereafter constitutes the permissible range.

The line starting with 'maximum data loss amount (data amount) due to a data non-update' indicates the permissible loss amount of the data itself as the recovery point. This line in particular indicates the range of the loss amount of the non-updated data relative to the first recovery point candidate designated by the administrator. More specifically, for example, when the range is registered as 'maximum data loss amount (data amount)=30 Gb of data non-update', the time points where the respective data from the data of the first recovery point candidate designated by the administrator up to and including a 30 Gb data update is performed exist constitute the recovery point permissible range.

The line starting with 'maximum data loss amount (data amount) due to data update' indicates the loss amount of the data permitted as the recovery point itself. This line in particular indicates the range of the updated data amount relatively with respect to the first recovery point candidate designated by the administrator. More specifically, when, for example, the range is registered as 'maximum data loss amount (data amount) due to data update=30 Gb', the time points where the respective data from the first recovery point candidate data designated by the administrator up to and including a 30 Gb data update is performed constitute the recovery point permissible range.

The line starting with 'maximum journal application amount' indicates the permissible journal application amount in the recovery processing. More specifically, when, for example, the amount is registered as 'maximum journal application amount=30 Gb', the permissible journal application amount is 30 Gb in the recovery processing.

Further, the lines that represent the above policies (that is, the conditions contained in the policy) can be designated selectively by the administrator. Further, as a modified condition, the priority level of the respective policies may be determined. This policy is an example and other policies can also be set in accordance with the implementation of the system.

(2) Operation of the Fourth Embodiment

The operation of this embodiment will be described next.

The majority of the operation of this embodiment is the same as that of the first embodiment and, therefore, mainly the differences will be described hereinbelow.

Figure 19:
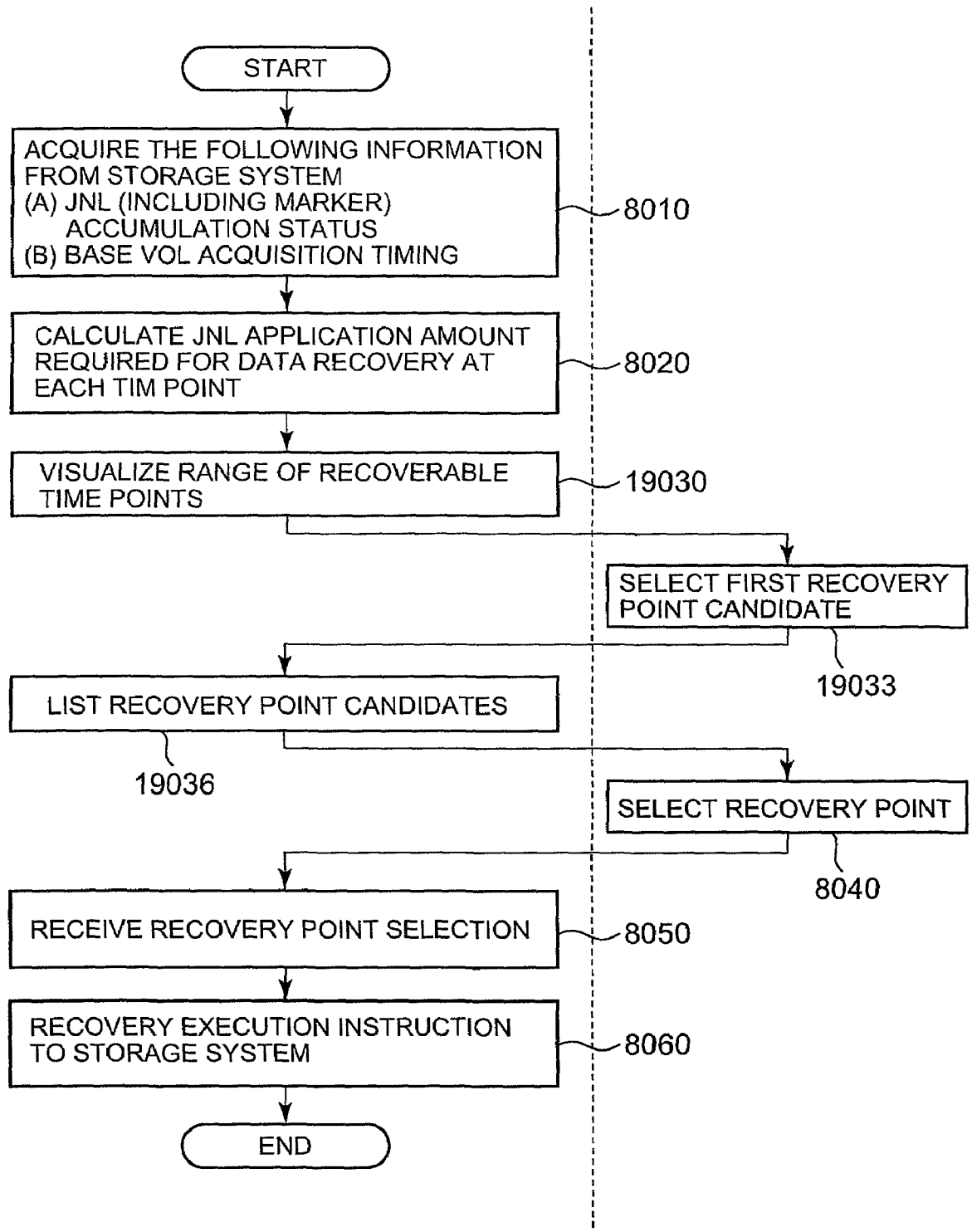
FIG. 19 shows an example of the flow of processing of the recovery instruction program according to the fourth embodiment.

FIG. 19 shows the flow of the processing when the recovery instruction program 1252 issues an instruction for recovery to the storage system 1000 in accordance with an instruction from the administrator, in the fourth embodiment. The flow of this processing is substantially the same as that of the first embodiment and, therefore, mainly the differences will be described.

Because the process up until step 8020 is the same as that of the first embodiment, a description of this process will be omitted.

In step 19030, the recovery instruction program 1252 displays the range of the recoverable time points (that is, a plurality of selectable recovery points) from the acquired accumulated information on the journals and markers. This interface will be described subsequently.

The administrator then selects the first recovery point candidate on the displayed interface (step 19033).

The recovery instruction program 1252 then displays respective recovery points that match the conditions described in the recovery policy 1253 as recovery points on the basis of the selected first recovery point candidate and the recovery policy 1253 (step 19036). This interface will be described subsequently.

Thereafter, the administrator selects the desired recovery point from the interface displayed in step 19036 (step 8040). Since the subsequent process is the same as that of the first embodiment, a description thereof will be omitted.

Figure 20:
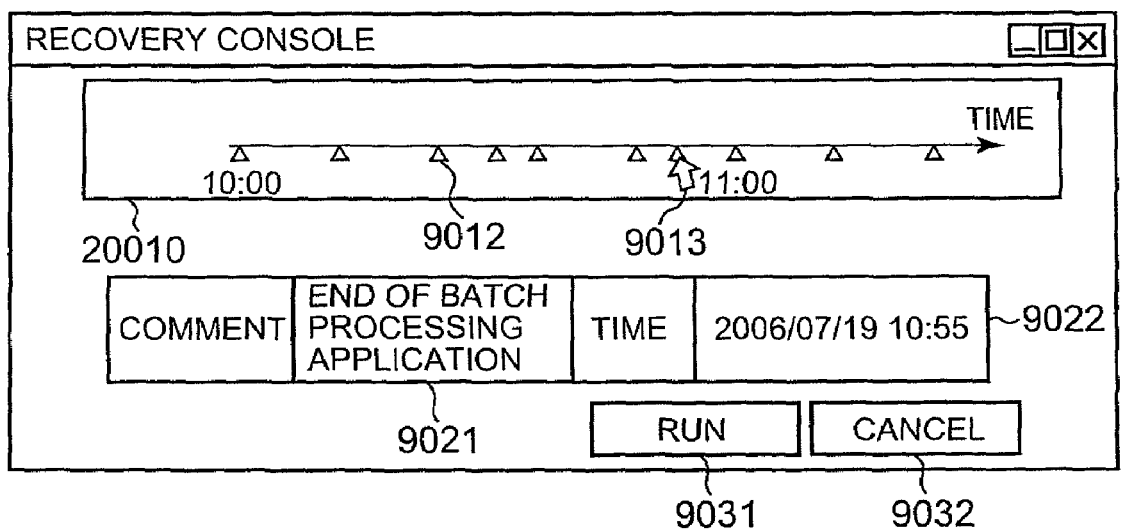
FIG. 20 shows an example of a GUI that is displayed by the fourth embodiment and which displays a plurality of recovery points that can be selected.

FIG. 20 is an example of an interface that is displayed in step 19030.

The majority of this interface is the same as that of FIG. 9A and, therefore, mainly the differences will be described hereinafter.

In this interface (GUI), a number line 20010 that shows a range of recoverable time points is displayed instead of a two-dimensional graph 9010. The horizontal axis of the number line 20010 represents time. 9012 and 9013 are the same as in FIG. 9A and, therefore, a description will be omitted. Furthermore, because the text field 9023 is not necessary in this GUI, same need not be displayed. Furthermore, in this GUI, the text field 9023 is not necessary and need not be displayed.

9031 is a button for finalizing the selection of the first recovery point candidate. When the administrator pushes this button 9031, an instruction to render the time point displayed in 9022 the first recovery point candidate is sent to the recovery instruction program 1252.

FIG. 21 is an example of the interface that is displayed in step 19036.

21019 is a pointer that moves in accordance with the input position of the mouse or the like. In step 8040, the administrator moves 21019 when performing the selection of the recovery point.

21010 is a list of recovery point candidates that is listed on the basis of the first recovery point candidate designated by the administrator and the recovery policy 1253. 21011 is a column that indicates which candidate is a recovery point. When the administrator uses the pointer 21019 to select a row of recovery point candidates designated as recovery points by the administrator, a check mark is entered in this column. The check mark of this column is displayed exclusively between recovery point candidates.

21012 is a column in which the time of the recovery point candidate is displayed with text. 21013 is a column in which the comment in the marker corresponding to the recovery point candidate is displayed by means of text. When a marker has not been inserted, there is no display of any kind. That is, according to the present invention, the recovery point may be a time point in which the marker is not inserted instead of or in addition to the time points in which the marker was inserted. That is, the CDP is able to operate even when there is no marker. In other words, any time point in the period in which the journal is held can be the recovery point. 21014 is a column in which the journal application amount corresponding to the recovery point candidate is displayed. 21015 is a column that indicates the data amount that is relatively lost from the data of the first recovery point candidate selected by the administrator. 21016 is a column that indicates the first recovery point selected by the administrator. 'o' is displayed in the case of the first recovery point candidate selected by the administrator. Otherwise, there is no display.

21021 is a button for finalizing the selection of the recovery point. When the administrator pushes this button, a request to recover the data of the recovery point candidate for which a check mark is displayed in 21011 is sent to the recovery instruction program 1252. 21022 is a button for terminating the processing described by using FIG. 19. When the administrator pushes this button, a request to terminate the processing described using FIG. 19 is sent to CPU1230 that operates in accordance with the recovery instruction program 1252. The CPU1230, which receives this request, forcibly terminates the processing.

The fourth embodiment was described hereinabove. According to the fourth embodiment, a plurality of recovery points are displayed selectively and the administrator selects a reference recovery point (first recovery point candidate) as a reference from among the plurality of recovery points.

Thereafter, recovery point candidates that conform to a valid condition that is described in the recovery policy 1253, which are recovery point candidates that conform to the condition that the first recovery point candidate be taken as a reference are filtered from among the plurality of recovery points are listed. A GUI that displays the listed recovery point candidates visualizes the relationship between the respective recovery point candidates and journal application amounts. Hence, when there are a plurality of recovery point candidates that coincide with the desired condition that the first recovery point candidate be taken as a reference, the administrator is able to correctly select a recovery point candidate with a short recovery time from among the plurality of recovery point candidates. The recovery time can therefore be kept short.

Although a few embodiments of the present invention were described hereinabove, these embodiments are illustrations that serve to describe the present invention and there is no intention to restrict the scope of the present invention to these embodiments alone. The present invention can also be implemented in a variety of other forms.

What is claimed is:

1. A control device associated with a storage system, the storage system comprising:

a first storage region operable to store first information representing a plurality of snapshot acquisition time points of a data storage device storing data transmitted from a higher level device;

a second storage region operable to store for respective journals, journal management data comprising second information including a time point at which data are written to the data storage device and a size of the journal for writing the data;

a third storage region operable to store third information representing a plurality of recovery points and comprising a plurality of recoverable time points of the data storage device storing data;

a recovery execution section operable to recover a data group at a recovery point designated by a recovery execution request among the plurality of recovery points, wherein the recovery execution section is operable to recover the data group in the data storage device at the designated recovery point among the plurality of recovery points by applying, to the data group of the data storage device at a snapshot acquisition time point that corresponds to the designated recovery point among the plurality of snapshot acquisition time points, a journal that corresponds to journal management data having a writing time point between the corresponding snapshot acquisition time point and the designated recovery point, and wherein the control device comprises:

an input device operable to receive a recovery designation;

an acquisition section operable to acquire said first information representing the plurality of snapshot acquisition time points, said second information representing the respective journal management data, and said third information representing the plurality of recovery points from the storage device when receiving the recovery designation;

a calculation section operable to calculate, for respective recovery points, load at the time of recovery after acquiring the plurality of recovery points, the total transfer data size of one or more data to be transferred in order to recover the data of the data storage device at the recovery point, on the basis of a plurality of snapshot acquisition time points represented by the acquired first information, the respective writing time points and respective journal sizes of the respective journal management data, and a plurality of recovery points represented by the acquired third information;

a display section operable to display a display screen that visualizes a correspondence relationship between the respective recovery points and respective recovery load information representing a recovery load expressed on the basis of the total transfer data size and calculated at the respective recovery points;

the input device being operable to receive a selection of recovery points which a user desires; and a recovery request section operable to transmit the recovery execution request and the selected recovery point to the recovery execution section, wherein said calculation section is operative to calculate a journal (JNL) application amount for each recovery point as load status, and wherein said display section is operative to display a display screen comprising the JNL application amount for a plurality of recovery points comparably.

2. The control device according to claim 1, wherein the storage system, when data is written on the data storage device, stores the data to be written and/or data to be overwritten on the data storage device in a data storage device which is different from the data storage device.

3. The control device according to claim 2, wherein the recovery execution section, when receiving the recovery execution request from the control device, is operable to recover data among a plurality of snapshots by applying, to snapshots corresponding to the selected recovery point, one or more data written on the corresponding snapshot between the snapshot acquisition time point and the recovery point or one or more overwritten data.

4. The control device according to claim 3, wherein the recovery load is a total transfer data size which is a total size of transfer data so as to recover data at the selected recovery point, the total transfer data size comprising data amount to be applied to a snapshot corresponding to the selected recovery point.

5. The control device according to claim 4, wherein the recovery execution section is operable to copy a portion or all of snapshots corresponding to the selected recovery point in a storage device that is different from the storage device storing the portion or all of the data;

the total transfer data size corresponding to the respective recovery points is the sum of data amount to be applied to the snapshot corresponding to the selected recovery point and the portion or all of data amount of the snapshots to be copied.

6. The control device according to claim 3, wherein the recovery execution section, when applying a plurality of data to the same address of snapshots corresponding to the recovery point, does not apply data other than data that is ultimately applied among the plurality of data.

7. The control device according to claim 6, wherein the calculation section, when applying a plurality of data to the same address of snapshots corresponding to the recovery point, calculates the total transfer data size based on data that is ultimately applied;

the display section displays the display screen that visualizes a correspondence relationship between the recovery time calculated for the respective recovery points and the respective recovery points.

8. The control device according to claim 6, wherein the recovery load is a recovery time that is a time length required for recovery;

the calculation section calculates the recovery time based on the total transfer data size, reading performance of a storage device storing data to be applied to the snapshots, and writing performance of a storage device at a recovery destination; and the display section displays the display screen that visualizes a correspondence relationship between the recovery time calculated for the respective recovery points and the respective recovery points.

9. A storage management method for managing data in a data storage system having at least one data storage device, a storage control device for controlling data storage in the at least one data storage device, a storage region for storing information representing a plurality of recovery points of said data storage device, and a recovery execution section for recovering data at a recovery point designated by a recovery execution request among the plurality of recovery points, the method comprising:

receiving at said control device a recovery designation, user-selected recovery points and a recovery execution request;

acquiring and storing first information representing a plurality of snapshot acquisition time points of a data storage device storing data transmitted from a higher level device to a storage system; journal management data comprising second information including a time point at which the data are written to the data storage device, and a size of the journal for writing the data, and third information representing the plurality of recovery points from a first storage device after receiving the recovery designation;

calculating, for respective recovery points, the total transfer data size of one or more data to be transferred in order to recover a data group of the data storage device at the recovery point on the basis of a plurality of snapshot acquisition time points represented by the acquired first information, the respective writing time points and respective journal sizes of the respective journal management data, a plurality of recovery points represented by the acquired third information, and a load at the time of recovery after acquiring the plurality of recovery points;

displaying visually a correspondence relationship between the respective recovery points and respective recovery load information representing a recovery load calculated at the respective recovery points; and transmitting the recovery execution request and the selected recovery point to the recovery execution section, recovering, at the recovery execution section, a data group at a recovery point designated by the recovery execution request among the plurality of recovery points, wherein the data group is recovered in the data storage device at the selected recovery point among the plurality of recovery points by applying, to the data group of the data storage device at a snapshot acquisition time point corresponding to the recovery point selected by the user from the plurality of snapshot acquisition time points, a journal corresponding to journal management data having writing time point of between the corresponding snapshot acquisition time point and the selected recovery point, and further, calculating a journal (JNL) application amount for each recovery point as load status, and displaying visually a display screen comprising the JNL application amount for a plurality of recovery points comparably.

10. The storage management method according to claim 9, further comprising:

when data is written on the data storage device, storing in a second data storage device data to be written and/or data to be overwritten on the first data storage device, said first data storage device being different from said second data storage device.

11. The storage management method according to claim 10, as a result of receiving the recovery execution request from the control device at the recovery execution section, recovering data among a plurality of snapshots by applying, to snapshots corresponding to the selected recovery point, one or more data written on the corresponding snapshot between a snapshot acquisition time point and the selected recovery point or one or more overwritten data.

12. The storage management method according to claim 11, wherein the recovery load is a total transfer data size which is a total size of transfer data so as to recover data at the selected recovery point, the total transfer data size comprising data amount to be applied to a snapshot corresponding to the selected recovery point.

13. The storage management method according to claim 12, further comprising:

copying in the recovery execution section a portion or all of snapshots corresponding to the selected recovery point in a storage device that is different from the storage device storing the portion or all of the data, wherein the total transfer data size corresponding to the respective recovery points is the sum of data amount to be applied to the snapshot corresponding to the selected recovery point and the portion or all of data amount of the snapshots to be copied.

14. The storage management method according to claim 11, wherein:

when applying by the recovery execution section a plurality of data to the same address of snapshots corresponding to the recovery point, avoiding application of data other than data that is ultimately applied among the plurality of data.

15. The storage management method according to claim 14, wherein, when applying, during the calculating step, a plurality of data to the same address of snapshots corresponding to the recovery point, calculating the total transfer data size based on data that is ultimately applied; and wherein the displaying step visualizes a correspondence relationship between the recovery time calculated for the respective recovery points and the respective recovery points.

16. The storage management method according to claim 14, wherein the recovery load is a recovery time that is a time length required for recovery, and wherein:

said calculating step further comprises:

calculating the recovery time based on the total transfer data size, reading performance of a storage device storing data to be applied to the snapshots, and writing performance of a storage device at a recovery destination; and said displaying step further comprises visually displaying a correspondence relationship between the recovery time calculated for the respective recovery points and the respective recovery points.

* * * * *